(12) United States Patent
Lenaerts et al.

(10) Patent No.: US 12,330,410 B2
(45) Date of Patent: Jun. 17, 2025

(54) MANUFACTURING METHODS OF DECORATIVE SURFACES

(71) Applicant: Agfa NV, Mortsel (BE)

(72) Inventors: Jens Lenaerts, Mortsel (BE); Johan Loccufier, Mortsel (BE); Aleix Costa, Mortsel (BE)

(73) Assignee: Agfa NV, Mortsel (BE)

( * ) Notice: Subject to any disclaimer, the term of this patent is extended or adjusted under 35 U.S.C. 154(b) by 29 days.

(21) Appl. No.: 18/547,016

(22) PCT Filed: Feb. 14, 2022

(86) PCT No.: PCT/EP2022/053532
§ 371 (c)(1),
(2) Date: Aug. 18, 2023

(87) PCT Pub. No.: WO2022/179879
PCT Pub. Date: Sep. 1, 2022

(65) Prior Publication Data
US 2024/0190106 A1 Jun. 13, 2024

(30) Foreign Application Priority Data
Feb. 26, 2021 (EP) .................................... 21159460

(51) Int. Cl.
*B32B 7/12* (2006.01)
*B32B 27/08* (2006.01)
(Continued)

(52) U.S. Cl.
CPC ................ *B32B 7/12* (2013.01); *B32B 27/08* (2013.01); *B32B 27/304* (2013.01); *B32B 37/06* (2013.01);
(Continued)

(58) Field of Classification Search
None
See application file for complete search history.

(56) References Cited

U.S. PATENT DOCUMENTS

2014/0370250 A1 12/2014 Fujii et al.

FOREIGN PATENT DOCUMENTS

EP 2105478 A1 9/2009
EP 2399965 A1 12/2011
(Continued)

OTHER PUBLICATIONS

U.S. Appl. No. 18/547,019, filed Aug. 18, 2023.
(Continued)

*Primary Examiner* — Laura C Powers
(74) *Attorney, Agent, or Firm* — Leydig, Voit & Mayer, Ltd.

(57) ABSTRACT

A method for manufacturing decorative surfaces including the steps of inkjet printing an image on a first thermoplastic foil by jetting and curing one or more pigmented free radical curable inkjet inks on the first thermoplastic foil: applying and curing a free radical curable liquid as an adhesive layer on the inkjet printed image: and heat pressing the first thermoplastic foil with a second thermoplastic foil into a decorative laminate: wherein at least one of the first and second thermoplastic foils is a transparent thermoplastic foil: wherein the one or more pigmented free radical curable inkjet inks include a colour pigment and a polymerizable composition containing 10 to 90 wt % of one or more monofunctional polymerizable compounds: and wherein the free radical curable liquid includes a polymerizable composition contains 15 wt % or more of polyfunctional polymerizable compounds and 15 wt % or more of a specific monofunctional polymerizable compound.

15 Claims, 1 Drawing Sheet

(51) Int. Cl.
  *B32B 27/30* (2006.01)
  *B32B 37/06* (2006.01)
  *B32B 37/10* (2006.01)
  *B32B 37/12* (2006.01)
  *B32B 38/00* (2006.01)

(52) U.S. Cl.
  CPC .............. *B32B 37/10* (2013.01); *B32B 37/12* (2013.01); *B32B 38/145* (2013.01); *B32B 2037/1253* (2013.01); *B32B 2307/4023* (2013.01); *B32B 2310/0831* (2013.01); *B32B 2310/0887* (2013.01); *B32B 2327/06* (2013.01)

(56) References Cited

FOREIGN PATENT DOCUMENTS

| | | |
|---|---|---|
| EP | 2399966 A1 | 12/2011 |
| EP | 2471879 A1 | 7/2012 |
| EP | 2682272 A1 | 1/2014 |
| EP | 3095613 A1 | 11/2016 |
| EP | 3095614 A1 | 11/2016 |
| EP | 3173229 A1 | 5/2017 |
| EP | 3300916 A1 | 4/2018 |
| EP | 2925529 B1 | 8/2020 |
| EP | 3693180 A1 | 8/2020 |
| EP | 3271188 B1 | 9/2020 |
| EP | 3738782 A1 | 11/2020 |
| WO | WO 2016/146565 A1 | 9/2016 |

OTHER PUBLICATIONS

European Patent Office, International Search Report in International Patent Application No. PCT/EP2022/053532, mailed May 30, 2022, 4 pp.

European Patent Office, Written Opinion in International Patent Application No. PCT/EP2022/053532, mailed May 30, 2022, 6 pp.

MANUFACTURING METHODS OF DECORATIVE SURFACES

CROSS-REFERENCE TO RELATED APPLICATIONS

This patent application is the U.S. national stage of copending International Patent Application No. PCT/EP2022/053532, filed Feb. 14, 2022, which claims the benefit of European Patent Application No. 21159460.1, filed Feb. 26, 2021.

TECHNICAL FIELD

The present invention relates to methods for manufacturing decorative surfaces, in particular decorative panels of PVC (polyvinyl chloride), also called vinyl tiles or vinyl strips for which often the abbreviation LVT (Luxurious Vinyl Tile) is used.

BACKGROUND ART

Decorative panels for furniture and flooring have traditionally been manufactured by using gravure printing for providing the decorative image, usually a wood image, of decorative panels. For manufacturing wood-based decorative panels, industrial inkjet printing systems have been introduced, because of their flexibility in use, such as the variable data printing making short production runs and personalized products possible at low cost.

A major drawback of these wood- and paper-based decorative panels is their limited water resistance, which prevents their use in bathrooms and kitchens. This problem has been resolved with gravure printed LVT, wherein a decorative image is laminated between two PVC sheets.

So far, industrial inkjet printing systems have not been adopted for LVT, because of adhesion problems between the decorative image and the PVC sheet.

Several aqueous inkjet technologies suitable for wood-based decorative panels have been explored for improving the adhesion of LVT panels, such as in EP 2925529 A (CERALOC INNOVATION), EP 3693180 A (UNILIN) and EP 3095613 A (AGFA). EP 3271188 A (TARKET) discloses a primer layer to improve the printability of floor or wall covering by aqueous ink compositions, the primer layer comprising one or more acrylic copolymers and silica and the covering comprising polyvinyl chloride. However, while some aqueous inkjet technologies provide improved adhesion, the water resistance of such panels is generally reduced, because hydrophilic layers tend to swell when exposed to water. Also, EP 3738782 A (SIHL) discloses the use of a microporous ink-receptive layer comprising inorganic particles and a binder, further comprising more than 6% by weight based on the weight of the ink receptive layer of polymerizable and/or crosslinkable monomeric or polymeric compounds having at least one (meth)acrylate moiety or a polymer which is crosslinked via (meth)acrylate moieties.

The use of UV curable inkjet systems has also been proposed, as for example in EP 3095614 A (AGFA). Additional measures for improving the adhesion of LVT printed with UV curable inkjet inks are nevertheless also necessary to bring it to a commercially acceptable level.

EP 3173229 A (TARKETT) discloses a method for producing LVT wherein the decorative layer is printed with a UV curable ink and wherein the UV curing is carried out with UV LED sources having a spectral emission in the range of 345-420 nm, so that during lamination, the UV curable ink is still incompletely cured. However, such an approach makes it vulnerable to scratches and dust problems in an industrial environment.

In EP 3300916 A (AGFA), an additional adhesive layer containing a vinylchloride-vinylacetate-vinylalcohol copolymer was applied on top of the cured UV inkjet inks for improving adhesion. However, such an adhesive layer is coated from organic solvent, which is not preferred for safety risks in an industrial environment.

There remains therefore a need for improved manufacturing methods of decorative laminates using inkjet technology that exhibits good water resistance and adhesion without requiring organic solvents.

SUMMARY OF INVENTION

In order to overcome the problems described above, preferred embodiments of the present invention have been realised with a method for decorative surfaces as defined by claim 1.

It was surprisingly found that using a free radical curable liquid containing no colour pigment or polymeric dispersant having a specific polymerizable composition allowed to achieve good adhesion properties in the lamination of a UV curable inkjet printed PVC sheet with a second PVC sheet, on the condition that the UV curable inkjet inks contained a specific polymerizable composition. The inventors believe that this may be explained by the weak boundary layer theory. Colour pigment and polymeric dispersant in an ink layer concentrate near the bonding surface and form a weak attachment to the PVC sheet to be laminated thereon Further advantages and embodiments of the present invention will become apparent from the following description.

BRIEF DESCRIPTION OF DRAWINGS

FIG. 2.A shows the hot pressing between an upper heat press plate (10) and a lower heat press plate (16) of an assembly including a transparent thermoplastic foil (11), a transparent or opaque thermoplastic foil (14) carrying a colour pattern (13) and an adhesive layer (12) and a base layer (15).

FIG. 2.B shows the hot pressing between an upper heat press plate (10) and a lower heat press plate (16) of an assembly including a transparent thermoplastic foil (11) carrying a colour pattern (13) and an adhesive layer (12), a transparent or opaque thermoplastic foil (14) and a base layer (15).

FIG. 2.C shows the hot pressing between an upper heat press plate (10) and a lower heat press plate (16) of an assembly including a transparent thermoplastic foil (11) and a base layer (15) carrying a colour pattern (13) and an adhesive layer (12).

FIG. 2.D shows the hot pressing between an upper heat press plate (10) and a lower heat press plate (16) of an assembly including a transparent thermoplastic foil (11) carrying a colour pattern (13) and an adhesive layer (12) and a base layer (15).

DESCRIPTION OF EMBODIMENTS

Definitions

Figure 1:
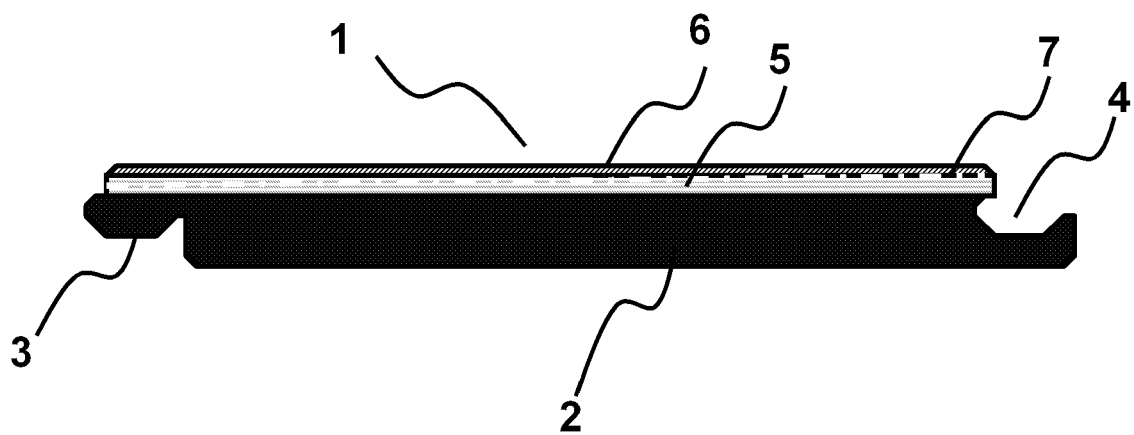
FIG. 1 shows a cross-section of a decorative panel (1) including a base layer (2) with a tongue (3) and groove (4) laminated on the top side by a transparent or opaque thermoplastic foil (5) and a transparent thermoplastic foil (6), wherein a decorative layer (7) is located between the transparent or opaque thermoplastic foil (5) and the transparent thermoplastic foil (6). The decorative layer (7) includes a colour pattern and an adhesive layer.

The term "monofunctional polymerizable compound" means that the polymerizable compound includes one polymerizable group.

The term "difunctional polymerizable compound" means that the polymerizable compound includes two polymerizable groups.

The term "polyfunctional polymerizable compound" means in the present invention that the polymerizable compound includes two or more than two polymerizable groups.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_2$ to $C_6$-alkenyl group.

Unless otherwise specified a substituted or unsubstituted alkynyl group is preferably a $C_2$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{20}$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester, amide, ether, thioether, ketone, aldehyde, sulfoxide, sulfone, sulfonate ester, sulphonamide, —Cl, —Br, —I, —OH, —SH, —CN and —$NO_2$.

Manufacturing Methods

A method for manufacturing decorative surfaces according to a preferred embodiment of the present invention includes the steps of:
inkjet printing an image on a first thermoplastic foil by jetting and curing one or more pigmented free radical curable inkjet inks on the first thermoplastic foil applying and curing a free radical curable liquid as an adhesive layer on the inkjet printed image; and
heat pressing the first thermoplastic foil with a second thermoplastic foil into a decorative laminate;
wherein at least one of the first and second thermoplastic foils is a transparent thermoplastic foil;
wherein the one or more pigmented free radical curable inkjet inks include a colour pigment and a polymerizable composition containing 10 to 90 wt % of one or more monofunctional polymerizable compounds;
wherein the free radical curable liquid includes a polymerizable composition contains 15 wt % or more of polyfunctional polymerizable compounds and 15 wt % or more of a monofunctional polymerizable compound A or B;
wherein all weight percentages wt % are based upon the total weight of the polymerizable composition in the pigmented free radical curable inkjet ink or the polymerizable composition in the free radical curable liquid;
wherein monofunctional polymerizable compound A is a compound according to Formula (1):

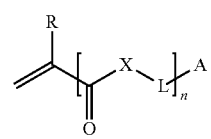

Formula (1)

with R representing hydrogen or a methyl group; X representing an oxygen or an NR'-group; L representing a divalent linking group having no more than 10 carbon atoms; R' being selected from the group consisting of hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group; n representing 0 or 1; and A represents a moiety according to Formula (1A):

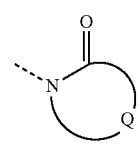

Formula (1A)

with Q representing the necessary atoms to form a five to eight membered ring and the dashed line represents a covalent bond to a carbon atom;
wherein monofunctional polymerizable compound B is a compound according to Formula (2):

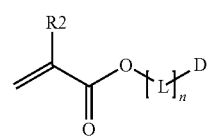

Formula (2)

with R2 representing hydrogen or a methyl group; L representing a divalent linking group having no more than 10 carbon atoms; n representing 0 or 1; and D represents a five to seven membered saturated heterocyclic ring containing a single ether group.

The thermoplastic foils can be cast polypropylene (cPP) films, polyester films (PET) or polyvinylchloride (PVC) films, including also biaxially oriented polypropylene (BOPP) films and biaxially oriented polyester (BOPET) films. However, the best adhesion results are obtained with PVC foils. The thickness of the thermoplastic foils is usually between 12 μm and 500 μm, typically between 30 μm and 300 μm.

In a preferred embodiment, the first and second thermoplastic foils include polyvinylchloride.

Figure 2:
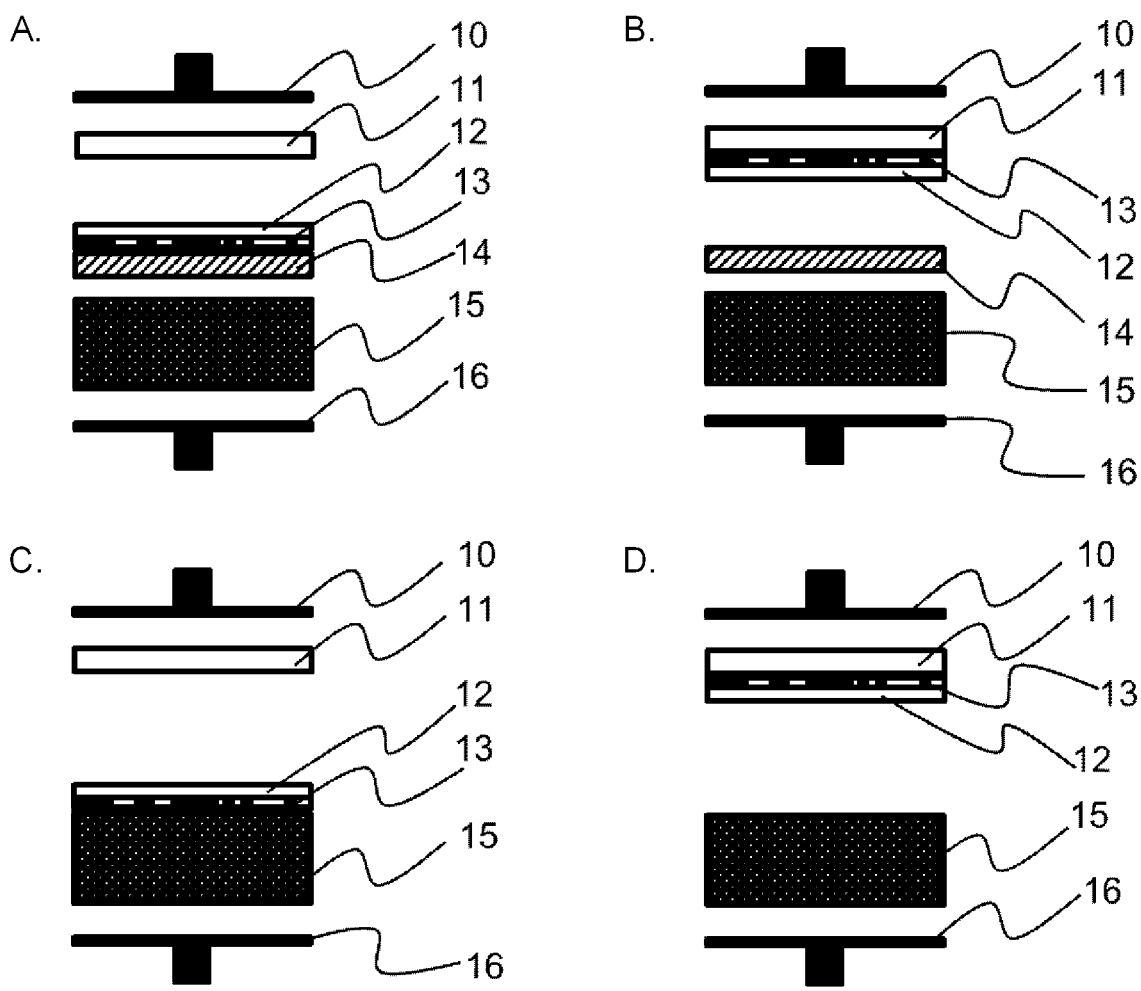
FIG. 2 shows four ways how the invention can be implemented.

As shown in FIGS. 2.C and 2.D, the base layer can take over the role of one of the thermoplastic foils if the free radical curable inkjet inks exhibit sufficient adhesion to the base layer.

Free Radical Curable Liquids

The free radical curable liquid differs from a free radical curable inkjet ink by not imparting a colour when applied on a white substrate. The absence of colour pigment and dispersant in the free radical curable liquid improves the adhesion of a decorative laminate.

The free radical curable liquid used in the present invention includes a polymerizable composition containing 15 wt % or more of polyfunctional polymerizable compounds and 15 wt % or more of a monofunctional polymerizable compound A or B;
  wherein all weight percentages wt % are based upon the total weight of the polymerizable composition in the free radical curable liquid;
  wherein monofunctional polymerizable compound A is a compound according to Formula (1):

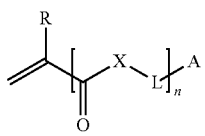

Formula (1)

with R representing hydrogen or a methyl group; X representing an oxygen or an NR'-group; L representing a divalent linking group having no more than 10 carbon atoms; R' being selected from the group consisting of hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group; n representing 0 or 1; and A represents a moiety according to Formula (1A):

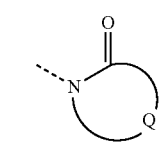

Formula (1A)

with Q representing the necessary atoms to form a five to eight membered ring and the dashed line represents a covalent bond to a carbon atom;

wherein monofunctional polymerizable compound B is a compound according to Formula (2):

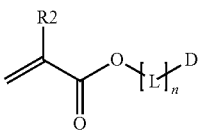

Formula (2)

with R2 representing hydrogen or a methyl group; L representing a divalent linking group having no more than 10 carbon atoms; n representing 0 or 1; and D represents a five to seven membered saturated heterocyclic ring containing a single ether group.

In a preferred embodiment, the free radical curable liquid has a viscosity between 5 and 15 mPa·s at 45° C. and at a shear rate of $1,000$ s$^{-1}$. Such a viscosity allows the free radical curable liquid to be jetted by an industrial print head. If the free radical curable liquid is not applied by a print head, but by a coating technique or a printing technique such as flexography or gravure, then higher viscosities can be used to improve the layer quality.

It has been observed that excessive amounts of surfactant can deteriorate the adhesion of a decorative laminate. In a preferred embodiment, the free radical curable liquid contains a surfactant in amount of no more than 0.3 wt %, preferably 0 to 0.2 wt % based on the total weight of the free radical curable liquid.

Monofunctional Polymerizable Compounds A

The monofunctional polymerizable compound A is a compound according to Formula (1):

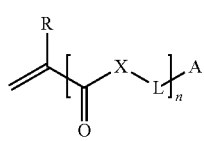

Formula (1)

with R representing hydrogen or a methyl group; X representing an oxygen or an NR'-group; L representing a divalent linking group having no more than 10 carbon atoms; R' being selected from the group consisting of hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group, n representing 0 or 1; and A represents a moiety according to Formula (1A):

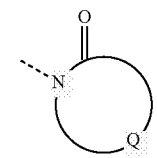

Formula (1A)

with Q representing the necessary atoms to form a five to eight membered ring and the dashed line represents a covalent bond to a carbon atom.

In a preferred embodiment, R represents hydrogen. A higher curing speed was observed when R represents hydrogen.

In a preferred embodiment X represents an oxygen. Higher curing speed was also observed when X represents an oxygen.

In an even more preferred embodiment, R represents hydrogen and X represents an oxygen.

In a preferred embodiment, the divalent linking group L is preferably an unsubstituted straight carbon chain having no more than 10 carbon atoms, preferably having 1 to 6 carbon atoms, more preferably a group selected from —CH$_2$—; —CH$_2$—CH$_2$— and —CH$_2$—CH$_2$—CH$_2$—.

In another preferred embodiment n represents 0, more preferably with R representing hydrogen.

In a particularly preferred embodiment, said monomer has a structure according to Formula (1B)

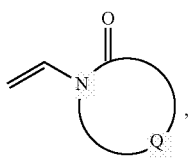

Formula (1B)

wherein Q represents the necessary atoms to form a five to eight membered ring.

Preferred polymerizable compounds A are given in Table 1.

TABLE 1

| PCA-1 | 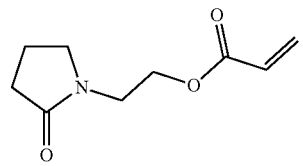 |
| PCA-2 | 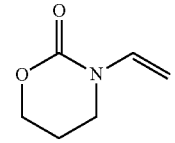 |
| PCA-3 | 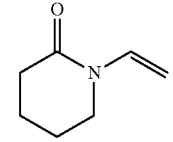 |
| PCA-4 | 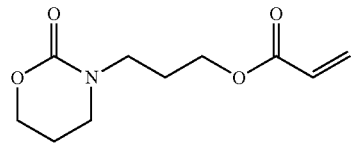 |
| PCA-5 | 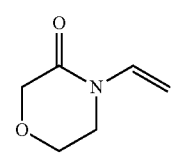 |

TABLE 1-continued

| PCA-6 | 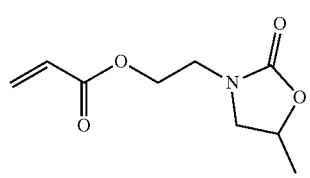 |
| PCA-7 | 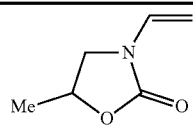 |
| PCA-8 | 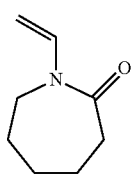 |
| PCA-9 | 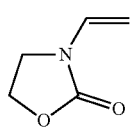 |
| PCA-10 | 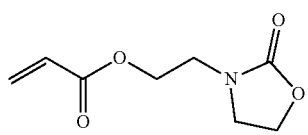 |
| PCA-11 | 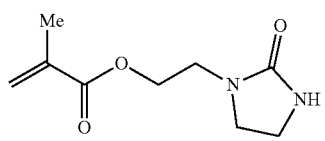 |
| PCA-12 | 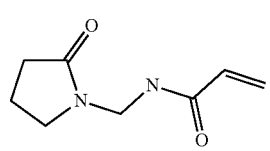 |
| PCA-13 | 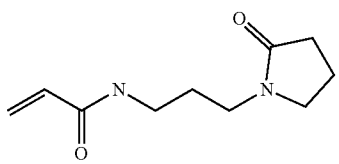 |
| PCA-14 | 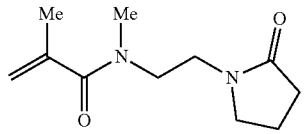 |
| PCA-15 | 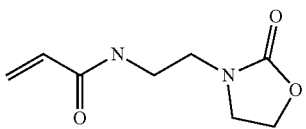 |

TABLE 1-continued

| PCA-16 | 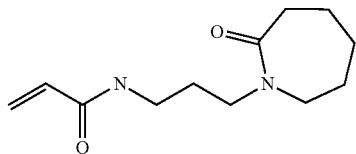 [SMILES: C=CC(=O)NCCCN1CCCCCC1=O] |

(Meth)acrylated compounds are preferred over (meth)acrylamide compounds. The (meth)acrylamide compounds can be prepared according to the following scheme disclosed by CN 108239236 (CHENGDU POLLOCK TECH CO) with R representing H:

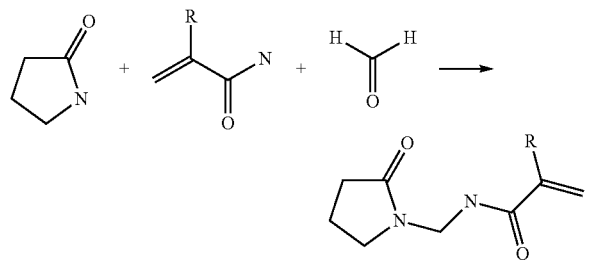

or by the following scheme:

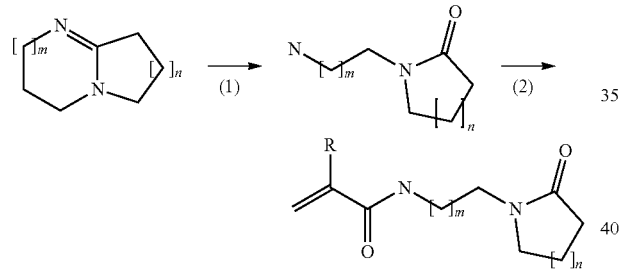

with step 1 disclosed by Gonçalves et al., Amino Acids, 40, 197-204 (2011) and by Hyde et al., Organic Process Research and Development, 23, 1860-1871 (2019) and step 2 by WO 2018/132370 (ISP INVESTMENTS).

Particularly preferred monofunctional polymerizable compounds A are PCA-1, PCA-2, PCA-4, PCA-6 and PCA-11. The most preferred compounds are PCA-1, PCA-2 and PCA-6.

A monofunctional polymerizable compound A may also be used in combination with one or more other monofunctional polymerizable compounds A and/or with one or more monofunctional polymerizable compounds B.

The amount of monofunctional polymerizable compounds A and/or B is at least 15 wt %, preferably at least 20 wt %, and most preferably at least 24 wt % based on the total weight of the polymerizable composition of the free radical curable liquid.

Monofunctional Polymerizable Compounds B

The monofunctional polymerizable compound B is a compound according to Formula (2):

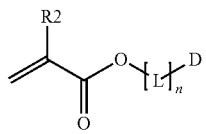

Formula (2)

with R2 representing hydrogen or a methyl group; L representing a divalent linking group having no more than 10 carbon atoms; n representing 0 or 1; and D represents a five to seven membered saturated heterocyclic ring containing a single ether group.

In a preferred embodiment, R2 represents a hydrogen. A higher curing speed was observed when R2 represents hydrogen.

In a preferred embodiment, n represents 1.

In a preferred embodiment, the divalent linking group L is preferably a straight carbon chain having no more than 10 carbon atoms, preferably having 1 to 6 carbon atoms, more preferably a group selected from $-CH_2-$; $-CH_2-CH_2-$; $-CH_2-CH_2-CH_2-$; $-CH_2-CH_2-CH_2-CH_2-$ and $-CH_2-CH_2-O-CH_2-$.

In an even more preferred embodiment, D represents a five membered saturated heterocyclic ring containing a single ether group.

Particularly preferred polymerizable compounds B are given in Table 2.

TABLE 2

| PC B-1 | 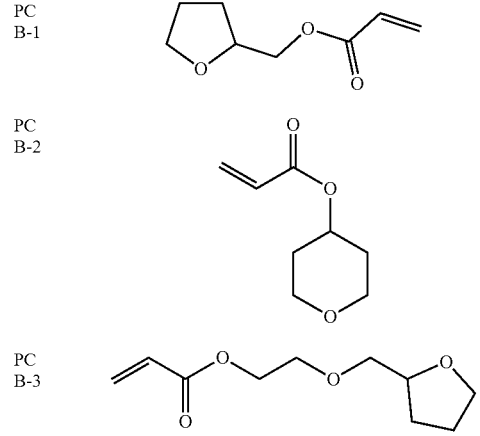 |
| PC B-2 | |
| PC B-3 | |

A monofunctional polymerizable compound B may also be used in combination with one or more other monofunctional polymerizable compounds B and/or with one or more monofunctional polymerizable compounds A.

In a preferred embodiment, the free radical curable liquid contains no polymerizable compound B, but only one or more polymerizable compounds A. It has been observed that free radical curable liquids containing a polymerizable compound B have an inferior printing reliability than corresponding free radical curable liquids containing a polymerizable compound A, especially when assessing latency. Latency is the ability of the free radical curable liquid to immediately print without failing nozzles after sitting idle in a print head for a period of time. Poor latency is often caused by the evaporation of polymerizable compounds from nozzles in the print head.

Polyfunctional Polymerizable Compounds

There is no real limitation on the polyfunctional polymerizable compound. Any polyfunctional monomer and oligomer capable of free radical polymerization may be used as the polyfunctional polymerizable compound. Suitable polyfunctional polymerizable compounds may be any polyfunctional monomer and/or oligomer found in the Polymer Handbook Vol 1+2, 4th edition, edited by J. BRANDRUP et al., Wiley-Interscience, 1999.

Polyfunctional polymerizable compound may be selected from the group consisting of triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate, glycerinpropoxy triacrylate, alkoxylated cyclohexanone dimethanol diacrylate, caprolactam modified dipentaerythritol hexaacrylate, alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate, neopentyl glycol diacrylate, vinylether acrylates, propoxylated glycerine triacrylate and propoxylated trimethylolpropane triacrylate, di-trimethylolpropane tetraacrylate, dipentaerythritol pentaacrylate, ethoxylated pentaeryhtitol tetraacrylate, methoxylated glycol acrylates and acrylate esters.

Preferred vinylether acrylates are those disclosed in U.S. Pat. No. 6,310,115 (AGFA). A particularly preferred compound is 2-(2-vinyloxyethoxy)ethyl acrylate. Other suitable vinylether acrylates are those disclosed in columns 3 and 4 of U.S. Pat. No. 6,767,980 B (NIPPON SHOKUBAI).

In a particularly preferred embodiment, the free radical curable liquid contains a polyfunctional polymerizable compound selected from dipropylene glycol diacrylate, tricyclodecanedimethanol diacrylate and 1,6-hexanediol diacrylate.

In the most preferred embodiment, the free radical curable liquid contains at least tricyclodecanedimethanol diacrylate as polyfunctional polymerizable compound. It was observed that with this polymerizable compound the adhesion is maximized.

The polyfunctional polymerizable compound is present in an amount of at least 15 wt %, preferably 20 to 80 wt %, more preferably 30 to 70 wt % and most preferably 40 to 60 wt % based on the total weight of the polymerizable composition in the free radical curable liquid. In the preferred ranges, the adhesion is maximized.

In a particularly preferred embodiment, the free radical curable liquid contains tricyclodecanedimethanol diacrylate in an amount of at least 15 wt %, preferably 20 to 80 wt %, more preferably 30 to 70 wt % and most preferably 40 to 60 wt % based on the total weight of the polymerizable composition in the free radical curable liquid. In the preferred ranges, the adhesion is maximized.

Other Monofunctional Polymerizable Compounds

There is no real limitation on the other monofunctional polymerizable compound. Any monofunctional monomer and oligomer capable of free radical polymerization may be used as the other monofunctional polymerizable compound. Suitable other monofunctional polymerizable compounds may be any monofunctional monomer and/or oligomer found in the Polymer Handbook Vol 1+2, 4th edition, edited by J. BRANDRUP et al., Wiley-Interscience, 1999.

In a preferred embodiment, the other monofunctional polymerizable compound includes an ethylenically unsaturated polymerizable group selected from the group consisting of an acrylate, a methacrylate, an acrylamide, a methacrylamide, a styrene group, a maleate, a fumarate, an itaconate, a vinyl ether, a vinyl ester, an allyl ether and an allyl ester.

In a more preferred embodiment, the other monofunctional polymerizable compound is a monoacrylate, preferably selected from the group consisting of isoamyl acrylate, stearyl acrylate, lauryl acrylate, octyl acrylate, decyl acrylate, isoamylstyl acrylate, isostearyl acrylate, 2-ethylhexyldiglycol acrylate, 2-hydroxybutyl acrylate, 2-acryloyloxyethylhexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, 2-acryloyloxyethylsuccinic acid, 2-acryloyxyethylphthalic acid, 2-acryloxyethyl-2-hydroxyethyl-phthalic acid, lactone modified flexible acrylate, and t-butylcyclohexyl acrylate, Acrylamides or substituted acrylamides, such as acryloylmorpholine, can also be used as the other monofunctional polymerizable compound.

A particularly preferred other polymerizable compound includes a compound according to Formula (2B):

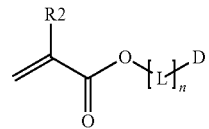

Formula (2B)

with R2 representing hydrogen or a methyl group; L representing a divalent linking group having no more than 10 carbon atoms; n representing 0 or 1; and D represents a three or four membered saturated heterocyclic ring containing a single ether group. Such cyclic ethers are not capable to act on their own as an effective monofunctional polymerizable compound B, but do further improve the adhesion when combined with one or more monofunctional polymerizable compounds A and/or B. In a preferred embodiment, R2 represents a hydrogen. A higher curing speed was observed when R2 represents hydrogen.

In a preferred embodiment, n represents 1.

In a preferred embodiment, the divalent linking group L is preferably a straight carbon chain having no more than 10 carbon atoms, preferably having 1 to 6 carbon atoms, more preferably a group selected from —CH$_2$—; —CH$_2$—

CH$_2$—; —CH$_2$—CH$_2$—CH$_2$—; —CH$_2$—CH$_2$—CH$_2$—CH$_2$— and —CH$_2$—CH$_2$—O—CH$_2$—.

Particularly preferred polymerizable compounds B are given in Table 3.

TABLE 3

| | |
|---|---|
| CE-1 | 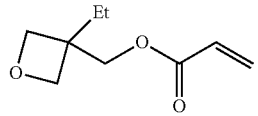 |
| CE-2 | 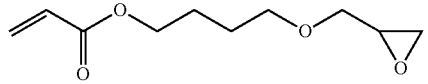 |
| CE-3 | 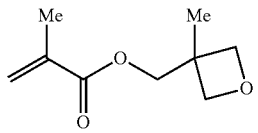 |
| CE-4 | 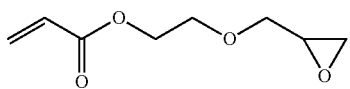 |
| CE-5 | 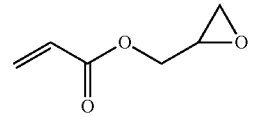 |

Free Radical Curable Inkjet Inks

The one or more pigmented free radical curable inkjet inks contain a colour pigment as colorant and have a polymerizable composition containing 10 to 90 wt % of one or more monofunctional polymerizable compounds. Consequently, this means that the pigmented free radical curable inkjet ink contains at least 10 wt % of polyfunctional polymerizable compounds in polymerizable composition. The presence of at least 10 wt % of polyfunctional polymerizable compounds provides the necessary cohesive strength to the ink layer. For maximizing adhesion, the one or more pigmented free radical curable inkjet inks preferably contain 40 to 80 wt % of one or more monofunctional polymerizable compounds based on the total weight of the polymerizable composition.

The one or more pigmented free radical curable inkjet inks preferably form an inkjet ink set having differently coloured inkjet inks. The inkjet ink set may be a standard CMYK ink set, but is preferably a CRYK ink set wherein the magenta (M) ink is replaced by red (R) inkjet ink. The use of a red inkjet ink enhances the colour gamut for wood based colour patterns, which represent the majority of decorative laminate panels in flooring.

A particularly preferred ink set includes a) a cyan free radical curable inkjet ink containing a copper phthalocyanine pigment or C.I. Pigment Blue 60; b) a red free radical curable inkjet ink containing a pigment selected from the group consisting of C.I. Pigment Red 122, C.I. Pigment Red 144, C.I. Pigment Red 176, C.I. Pigment Red 188, C.I. Pigment Red 207, C.I. Pigment Red 242, C.I. Pigment Red 254, C.I. Pigment Red 272 and mixed crystals thereof; c) a yellow free radical curable inkjet ink containing a pigment selected from the group consisting of C.I. Pigment Yellow 83, C.I. Pigment Yellow 97, C.I. Pigment Yellow 93, C.I. Pigment Yellow 110, C.I. Pigment Yellow 120, C.I. Pigment Yellow 150, C.I. Pigment Yellow 151, C.I. Pigment Yellow 154, C.I. Pigment Yellow 155, C.I. Pigment Yellow 175, C.I. Pigment Yellow 180, C.I. Pigment Yellow 181, C.I. Pigment Yellow 194, C.I. Pigment Yellow 213, C.I. Pigment Yellow 214 and mixed crystals thereof; and d) a black free radical curable inkjet ink containing a carbon black pigment.

For multi-pass inkjet devices, the smaller amount print heads compared to a single pass inkjet device allows to extend the ink set with different colours. For example, the ink set may be a CMRYK ink set. Such an ink set allows to accurately reproduce both wood motifs and other "fashion" motifs having more brilliant colours.

The inkjet ink set may be extended with other inks such as brown, green, blue, purple and/or orange to further enlarge the colour gamut of the ink set.

The inkjet ink set may also be extended by the combination of full density inkjet inks with light density inkjet inks. The combination of dark and light colour inks and/or black and grey inks improves the image quality by a lowered graininess. A preferred ink set includes dark and light black inkjet inks as this allows to minimize the increase of the number of print heads, while still adequately lowering graininess based on the principle of under colour removal.

In a preferred embodiment of the ink set, the free radical curable liquid contains a polymerizable composition containing 20 wt % or more of polyfunctional polymerizable compounds and 30 wt % or more of a monofunctional polymerizable compound A or B based on the total weight of the polymerizable composition.

In a preferred embodiment, the one or more free radical curable inkjet inks have a viscosity between 5 and 15 mPa·s at 45° C. and at a shear rate of 1,000 s$^{-1}$. Such a viscosity allows the free radical curable inkjet ink to be jetted by reliable industrial print heads.

The surface tension of the one or more free radical curable inkjet inks is preferably in the range of 18 mN/m to 35 mN/m at 25° C., more preferably in the range of about 20 mN/m to about 30 mN/m at 25° C. In these ranges, good ink spreading is obtained on the thermoplastic foil.

Colour Pigments

The colour pigments may be black, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley-VCH, 2004. ISBN 3527305769.

Particularly preferred pigments for a cyan aqueous inkjet ink are C.I Pigment Blue 60 and a copper phthalocyanine pigment, more preferably C.I. Pigment Blue 15:3 or C.I. Pigment Blue 15:4.

A red free radical curable inkjet ink preferably contains a pigment selected from the group consisting of C.I. Pigment Red 122, C.I. Pigment Red 144, C.I. Pigment Red 176, C.I. Pigment Red 188, C.I. Pigment Red 207, C.I. Pigment Red 242, C.I. Pigment Red 254, C.I. Pigment Red 272 and mixed crystals thereof.

A yellow free radical curable inkjet ink preferably contains a pigment selected from the group consisting of C.I. Pigment Yellow 83, C.I. Pigment 93, C.I. Pigment Yellow 97, C.I. Pigment Yellow 110, C.I. Pigment Yellow 120, C.I. Pigment Yellow 150, C.I. Pigment Yellow 151, C.I. Pigment Yellow 154, C.I. Pigment Yellow 155, C.I. Pigment Yellow 175, C.I. Pigment Yellow 180, C.I. Pigment Yellow 181, C.I.

Pigment Yellow 194, C.I. Pigment Yellow 213, C.I. Pigment Yellow 214 and mixed crystals thereof.

For a black ink, suitable pigment materials include carbon blacks such as Regal™ 400R, Mogul™ L, Elftex™ 320 from Cabot Co., or Carbon Black FW18, Special Black™ 250, Special Black™ 350, Special Black™ 550, Printex™ 25, Printex™ 35, Printex™ 55, Printex™ 90, Printex™ 150T from DEGUSSA Co., MA8 from MITSUBISHI CHEMICAL Co., and C.I. Pigment Black 7 and C.I. Pigment Black 11.

Also mixed crystals may be used. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia™ Magenta RT-355-D from Ciba Specialty Chemicals.

Also mixtures of pigments may be used. For example, a black inkjet ink may include a carbon black pigment and at least one pigment selected from the group consisting of a blue pigment, a cyan pigment, a magenta pigment and a red pigment. It was found that such a black inkjet ink allowed easier and better colour management for wood colours.

The pigment particles in the pigmented inkjet ink should be sufficiently small to permit free flow of the ink through the inkjet printing device, especially at the ejecting nozzles. It is also desirable to use small particles for maximum colour strength and to slow down sedimentation.

The average particle size of the pigment in the pigmented inkjet ink should preferably be between 0.05 µm and 1 µm. Preferably the average pigment particle size is between 0.05 and 0.5 µm, more preferably between 0.08 and 0.3 µm, particularly preferably between 0.1 and 0.2 µm and most preferably between 0.1 and 0.15 µm.

The pigment is used in the inkjet ink in an amount of 0.1 to 20 wt %, preferably 1 to 10 wt %, and most preferably 2 to 6 wt % based on the total weight of the pigmented inkjet ink. A pigment concentration of at least 2 wt % is preferred to reduce the amount of inkjet ink needed to produce the colour pattern, while a pigment concentration higher than 5 wt % reduces the colour gamut for printing the colour pattern with print heads having a nozzle diameter of 20 to 50 µm.

When the pigmented free radical inkjet inks are printed on a thermoplastic foil or base layer having insufficient whiteness, a white pigmented free radical curable inkjet ink may be included in the ink set.

A white inkjet ink preferably includes a pigment with a high refractive index, preferably a refractive index greater than 1.60, preferably greater than 2.00, more preferably greater than 2.50 and most preferably greater than 2.60. Such white pigments generally have a very high covering power, i.e. a limited amount of white ink is necessary to hide the colour and defects of the core layer. The most preferred white pigment is titanium dioxide.

The white inkjet ink preferably contains the white pigment in an amount of 8 wt % to 30 wt %, more preferably 12 to 25 wt % of white pigment based upon the total weight of the white inkjet ink.

The numeric average particle diameter of the white pigment is preferably from 150 to 500 nm, and most preferably from 180 to 300 nm. Sufficient hiding power cannot be obtained when the average diameter is less than 150 nm, and the storage ability and the jet-out suitability of the ink tend to be degraded when the average diameter exceeds 500 nm.

The determination of the numeric average particle diameter is best performed by photon correlation spectroscopy at a wavelength of 633 nm with a 4 mW HeNe laser on a diluted sample of the pigmented inkjet ink. A suitable particle size analyzer used was a Malvern™ nano-S available from Goffin-Meyvis. A sample can, for example, be prepared by addition of one drop of ink to a cuvet containing 1.5 mL ethyl acetate and mixed until a homogenous sample was obtained. The measured particle size is the average value of 3 consecutive measurements consisting of 6 runs of 20 seconds.

Dispersants

The pigmented free radical curable inkjet ink contains a dispersant in order to further improve pigment dispersion properties. The dispersant is preferably a polymeric dispersant. Such dispersant improves the reliability of the inkjet printing process due to a generally smaller sedimentation speed, especially when they contain secondary or tertiary amine groups.

Typical polymeric dispersants are copolymers of two monomers but may contain three, four, five or even more monomers. The properties of polymeric dispersants depend on both the nature of the monomers and their distribution in the polymer. Copolymeric dispersants preferably have the following polymer compositions:

- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

Commercial examples of polymeric dispersants are the following:
- DISPERBYK™ dispersants available from BYK CHEMIE GMBH;

SOLSPERSE™ dispersants available from LUBRIZOL;
TEGO™ DISPERS™ dispersants from EVONIK;
EDAPLAN™ dispersants from MÜNZING CHEMIE;
ETHACRYL™ dispersants from LYONDELL;
GANEX™ dispersants from ISP;
DISPEX™ and EFKA™ dispersants from BASF;
DISPONER™ dispersants from DEUCHEM.

Particularly preferred polymeric dispersants include Solsperse™ dispersants from LUBRIZOL, Efka™ dispersants from BASF, Disperbyk™ dispersants from BYK CHEMIE GMBH, and Ajisper™ dispersants from AJINOMOTO FINE-TECHNO Co. Particularly preferred dispersants are Solsperse™ 32000, 35000 and 39000 dispersants from LUBRIZOL and Disperbyk™ 162 from BYK CHEMIE GMBH.

The dispersants may be used alone or in combination of two or more kinds thereof.

The polymeric dispersant is preferably used in an amount of 2 to 600 wt %, more preferably 5 to 200 wt %, most preferably 50 to 90 wt % based on the weight of the pigment.

Dispersion Synergists

A dispersion synergist usually consists of an anionic part and a cationic part. The anionic part of the dispersion synergist exhibiting a certain molecular similarity with the colour pigment and the cationic part of the dispersion synergist consists of one or more protons and/or cations to compensate the charge of the anionic part of the dispersion synergist.

The dispersion synergist is preferably added in a smaller amount than the polymeric dispersant(s). The ratio of polymeric dispersant/dispersion synergist depends upon the pigment and should be determined experimentally. Typically, the ratio wt % polymeric dispersant/wt % dispersion synergist is selected between 2:1 to 100:1, preferably between 2:1 and 20:1.

Suitable dispersion synergists that are commercially available include Solsperse™ 5000 and Solsperse™ 22000 from LUBRIZOL.

Particular preferred pigments for the magenta ink used are a diketopyrrolo-pyrrole pigment or a quinacridone pigment. Suitable dispersion synergists include those disclosed in EP 1790698 A (AGFA GRAPHICS), EP 1790696 A (AGFA GRAPHICS), WO 2007/060255 (AGFA GRAPHICS) and EP 1790695 A (AGFA GRAPHICS).

In dispersing C.I. Pigment Blue 15:3, the use of a sulfonated Cu-phthalocyanine dispersion synergist, e.g. Solsperse™ 5000 from LUBRIZOL is preferred. Suitable dispersion synergists for yellow inkjet inks include those disclosed in EP 1790697 A (AGFA GRAPHICS).

Polymerizable Compounds

The one or more pigmented free radical curable inkjet inks include a polymerizable composition containing 10 to 90 wt %, preferably 40 to 80 wt % of one or more monofunctional polymerizable compounds based on the total weight of the polymerizable composition.

Any monomer and oligomer capable of free radical polymerization may be used as polymerizable compound. The viscosity of the free radical curable inkjet ink can be adjusted by varying the ratio between the monomers and oligomers. The polymerizable compounds may be any monomer and/or oligomer found in the Polymer Handbook Vol 1+2, 4th edition, edited by J. BRANDRUP et al., Wiley-Interscience, 1999.

Polymerizable compounds used for the free radical curable liquid can also be suitably used in the pigmented free radical curable inkjet ink.

Photoinitiating System

If no electron beam curing is employed for curing the free radical curable liquid or the pigmented free radical curable inkjet inks, a photoinitiating system is used. The photoinitiating system contains at least one free radical photoinitiator, but preferably contains a combination of photoinitiators and preferably also one or more co-initiators.

The photoinitiator in the free radical curable liquid and inkjet inks may be a Norrish type I initiator or a Norrish type II initiator. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or a co-initiator. Both type I and type II photoinitiators can be used in the present invention, alone or in combination.

The photoinitiating system preferably includes 4 to 20 wt % of free radical photoinitiators and co-initiators.

Norrish Type I Photoinitiators

Preferred Norrish Type I photoinitiators for the UV curable inkjet ink of the invention are acylphosphine oxide and α-hydroxy ketone photoinitiators.

An acylphosphine oxide photoinitiator is particularly advantageous for curability when UV curing is performed with UV LEDs having a long wavelength of more than 360 nm, and even more when the acylphosphine oxide photoinitiator is further combined with a Norrish Type II photoinitiator containing a thioxanthone group.

Preferred examples of the acylphosphine oxide photoinitiators include, but are not particularly limited to, a bis(2,4,6-trimethylbenzoyl)-phenyl phosphine oxide, a 2,4,6-trimethylbenzoyl-diphenyl-phosphine oxide, and a bis-(2,6-dimethoxybenzoyl)-2,4,4-trimethylpentyl phosphine oxide.

Preferred commercially available acylphosphine oxide photoinitiators include, but are not particularly limited to, Omnirad™ 819 (bis(2,4,6-trimethyl benzoyl)-phenyl phosphine oxide), Omnipol™ TP, Omnirad™ TPO (2,4,6-trimethyl benzoyl-diphenyl-phosphine oxide), Omnirad™ TPO-L (Ethyl (2,4,6-trimethylbenzoyl) phenyl phosphinate), all available from IGM RESINS.

The content of the acylphosphine oxide photoinitiator is preferably 3 to 15 wt %, more preferably 5 to 13 wt %, and still more preferably 6 to 10 wt % based on the total weight of the UV curable inkjet ink.

Examples of the α-hydroxy ketone photoinitiators include, but are not particularly limited to, 1-hydroxycyclohexyl phenyl ketone, 2-hydroxy-2-methyl-1-phenyl propane-1-one and 1-[4-(2-hydroxyethoxy)-phenyl]2-hydroxy-2-methyl-1-propane-1-on.

Examples of commercially α-hydroxy ketone photoinitiators include, but are not particularly limited to, Omnirad™ 1173, Omnirad™ 184 and Omnirad™ 127 and Omnirad™ 4817 from IGM RESINS.

The content of the α-hydroxy ketone is preferably 1 to 10 wt %, more preferably 2 to 8 wt %, and still more preferably 3 to 6 wt % based on the total weight of the UV curable inkjet ink.

In a preferred embodiment, the one or more acyl groups of the acylphosphine oxide photoinitiator or α-hydroxy ketone photoinitiator are connected to a polymer or to a polymerizable group.

Suitable polymeric acylphosphine oxide photoinitiators are disclosed in EP 2960303 A (FUJFILM).

An example of a suitable polymeric α-hydroxy ketone photoinitiator is available as Esacure™ KIP150 from IGM RESINS.

Suitable polymerizable α-hydroxy ketone photoinitiators are disclosed in US 4922004 (MERCK), such as 4-(2-acryloyloxyethoxy)-phenyl 2-acryloyloxy-2-propyl ketone prepared in Example 3.

In a particularly preferred embodiment of the UV curable inkjet ink, the free radical photoinitiator includes at least 4 wt %, preferably 5 to 15 wt % of acylphosphine oxide initiator based on the total weight of the UV curable inkjet ink. In such an amount good curability is achieved when UV curing is performed with UV LEDs having a long wavelength of more than 360 nm.

Norrish Type II Photoinitiators

The free radical curable liquid and inkjet inks may contain a Norrish Type II photoinitiator including a photoinitiating moiety selected from the group consisting of a thioxanthone group and a benzophenone group. A Norrish Type II photoinitiator containing a thioxanthone group is particularly preferred as it is advantageous for UV LED curing, especially for UV LEDs having an emission wavelength of at least 360 nm or even 370 nm.

However, the free radical curable liquid and inkjet inks preferably do not contain a thioxanthone. Degradation products of thioxanthone after UV curing tend to give white colour an undesired yellowish hue or cyan colour an undesired greenish hue.

Suitable examples of Norrish Type II photoinitiators containing a thioxanthone group include, but are not particularly limited to, thioxanthone; diethylthioxanthone, such as 2,4-diethylthioxanthone; isopropylthioxanthone, such as 2-isopropylthioxanthone and 4-isopropylthioxanthone; and chlorothioxanthone, such as 2-chlorothioxanthone.

Specific examples of commercially available Norrish Type II photoinitiators containing a thioxanthone group are Speedcure™ DETX (2,4-diethylthioxanthone) and Speedcure™ ITX (2-isopropylthioxanthone) from LAMBSON and Kayacure™ DETX-S (2,4-diethylthioxanthone) from Nippon Kayaku Co.

Suitable examples of Norrish Type II photoinitiators containing a benzophenone group include, but are not particularly limited to, benzophenone; methylbenzophenone; methyl-2-benzoylbenzoate, phenylbenzophenone, such as 4-phenylbenzophenone; trimethylbenzophenone; bis(alkylamino)benzophenone; and 4-(dialkylamino)benzophenone.

Specific examples of commercially available Norrish Type II photoinitiators containing a benzophenone group are Omnirad™ 4MBZ and Omnirad™ BP from IGM RESINS, Speedcure™ PBZ and Speedcure™ 5040 from LAMBSON. The latter is a mixture of benzophenone and thioxanthone.

The content of the Norrish Type II photoinitiator including a photoinitiating moiety selected from the group consisting of a thioxanthone group and a benzophenone group is preferably 0.5 to 7.5 wt %, more preferably 1 to 5 wt % based on the total weight of the UV curable inkjet ink. However, if the Norrish Type II photoinitiator is a polymerizable or a polymeric thioxanthone compound, the content may be higher, preferably up to 25 wt %, more preferably up to 15 wt % based on the total weight of the UV curable inkjet ink.

Preferred examples of polymerizable Norrish Type II photoinitiators including a photoinitiating moiety selected from the group consisting of a thioxanthone group or a benzophenone group are disclosed in EP 2161264 A (AGFA), EP 2199273 A (AGFA) and EP 2684876 A (AGFA).

Preferred examples of polymeric Norrish Type II photoinitiators including a photoinitiating moiety selected from the group consisting of a thioxanthone group or a benzophenone group are disclosed in EP 1616920 A (AGFA) and EP 1616899 A (AGFA).

Commercial examples of polymeric thioxanthones and benzophenones include Omnipol™ BP, Omnipol™ TX, and Omnipol™ 2702 from IGM RESINS.

Co-Initiators

In order to increase the photosensitivity further, the UV curable inkjet ink may additionally contain co-initiators, also called polymerization synergists, for which usually amine synergists are used.

Suitable examples of amine synergists can be categorized in three groups:
1) tertiary aliphatic amines such as methyldiethanolamine, dimethylethanolamine, triethanolamine, triethylamine and N-methylmorpholine;
(2) aromatic amines such as amylparadimethylaminobenzoate, 2-n-butoxyethyl-4-(dimethylamino) benzoate, 2-(dimethylamino)ethylbenzoate, ethyl-4-(dimethylamino)benzoate, and 2-ethylhexyl-4-(dimethylamino) benzoate; and
(3) (meth)acrylated amines such as dialkylamino alkyl (meth)acrylates (e.g., diethylaminoethylacrylate) or N-morpholinoalkyl-(meth)acrylates (e.g., N-morpholinoethyl-acrylate).

The UV curable inkjet ink preferably includes a tertiary amine co-initiator, preferably a polymerizable or polymeric tertiary amine co-initiator.

Preferred diffusion hindered co-initiators are the polymerizable co-initiators disclosed in EP 2053101 A (AGFA) in paragraphs [0088] and [0097].

Preferred diffusion hindered co-initiators include a polymeric co-initiator having a dendritic polymeric architecture, more preferably a hyperbranched polymeric architecture. Preferred hyperbranched polymeric co-initiators are those disclosed in US 2006014848 A (AGFA).

The UV curable inkjet ink preferably includes the (diffusion hindered) co-initiator in an amount of 0.1 to 15 wt %, more preferably in an amount of 0.5 to 10 wt %, most preferably in an amount of 1 to 8 wt % of the total weight of the inkjet ink.

Polymerization Inhibitors

The free radical curable liquid and inkjet inks may also contain a polymerization inhibitor. Due to the fact that an ink contains the polymerization inhibitor, a polymerization reaction before curing, e.g. during storage or transport, can be prevented.

Suitable polymerization inhibitors include phenol type antioxidants, hindered amine light stabilizers, phosphor type antioxidants, benzoquinone, hydroquinone and derivatives, such as hydroquinone monomethyl ether commonly used in (meth)acrylate monomers.

Examples of the phenolic polymerization inhibitor include, but are not limited to the following substances, p-methoxy phenol, cresol, t-butyl catechol, di-t-butyl-p-cresol, hydroquinone monomethylether, α-naphthol, 3,5-di-t-butyl-4-hydroxytoluene, 2,6-di-t-butyl-4-methylphenol, 2,2'-methylene-bis(4-methyl-6-t-butylphenol), 2,2'-methylene-bis(4-ethyl-6-butylphenol), and 4,4'-thio-bis(3-methyl-6-t-butylphenol) and pyrogallol.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from ALLNEX.

A preferred polymerization inhibitor is Irgastab™ UV10 from BASF. Other examples of polymerization inhibitor include TEMPO, TEMPOL, and AI cupferron.

The polymerization inhibitors may be used alone or in combination of two or more kinds thereof.

In a preferred embodiment, the polymerization inhibitor is a mixture of different types of polymerization inhibitors. Preferred polymerization inhibitors are mixtures of an oxyl free radical-based polymerization inhibitor, a phenol-based polymerization inhibitor, and an amine-based polymerization inhibitor. Suitable examples are given in EP 2851402 A (FUJIFILM).

The polymerization inhibitor is preferably present in an amount of 200 to 20,000 ppm relative to the total amount of the inkjet ink. Below 200 ppm, the undesired polymerization is insufficiently inhibited and above 20,000 ppm the curing speed is heavily reduced.

Surfactants

The free radical curable liquid and inkjet inks may contain a surfactant. The surfactant can be anionic, cationic, non-ionic, or zwitter-ionic.

In the free radical curable liquid, the surfactant is preferably present in an amount of no more than 0.3 wt %, more preferably 0 to 0.2 wt % based on the total weight of the free radical curable liquid. At higher concentrations, the adhesion deteriorates rapidly.

In the pigmented free radical curable inkjet inks, the total quantity of surfactant is preferably less than 3 wt % based on the total weight of the ink and more preferably in a total less than 1.5 wt % based on the total weight of the free radical curable inkjet ink to prevent foaming of the ink in its container. The content of the surfactant is preferably 0.05 to 1.5 wt %, more preferably 0.10 to 1.0 wt % based on the total weight of the free radical curable inkjet ink.

Preferred surfactants are selected from fluoro surfactants (such as fluorinated hydrocarbons) and silicone surfactants. The silicone surfactants are preferably siloxanes and can be alkoxylated, polyester modified, polyether modified, polyether modified hydroxy functional, amine modified, epoxy modified and other modifications or combinations thereof. Preferred siloxanes are polymeric, for example polydimethylsiloxanes.

Preferred commercial silicone surfactants include BYK™ 333 and BYK™ UV3510 from BYK Chemie and Tegoglide™ 410 from EVONIK.

In a preferred embodiment, the surfactant is a polymerizable compound.

Preferred polymerizable silicone surfactants include a (meth)acrylated silicone surfactant. Most preferably the (meth)acrylated silicone surfactant is an acrylated silicone surfactant, because acrylates are more reactive than methacrylates.

In a preferred embodiment, the (meth)acrylated silicone surfactant is a polyether modified (meth)acrylated polydimethylsiloxane or a polyester modified (meth)acrylated polydimethylsiloxane.

Preferred commercially available (meth)acrylated silicone surfactants include: Ebecryl™ 350, a silicone diacrylate from ALLNEX; the polyether modified acrylated polydimethylsiloxane BYK™ UV3500, BYK™ UV3510 and BYK™ UV3530, the polyester modified acrylated polydimethylsiloxane BYK™ UV3570, all manufactured by BYK Chemie; Tego™ Rad 2100, Tego™ Rad 2200N, Tego™ Rad 2250N, Tego™ Rad 2300, Tego™ Rad 2500, Tego™ Rad 2600, Tego™ Rad 2700, and Tego™ RC711 all manufactured by EVONIK. Another preferred silicone is Silwet™ L7500 from OSI SPECIALTIES BENELUX NV.

from EVONIK; Silaplane™ FM7711, Silaplane™ FM7721, Silaplane™ FM7731, Silaplane™ FM0711, Silaplane™ FM0721, Silaplane™ FM0725, Silaplane™ TM0701, Silaplane™ TM0701T all manufactured by CHISSO Corporation; and DMS-R05, DMS-R11, DMS-R18, DMS-R22, DMS-R31, DMS-U21, DBE-U22, SIB1400, RMS-044, RMS-033, RMS-083, UMS-182, UMS-992, UCS-052, RTT-1011 and UTT-1012 all manufactured by GELEST Inc.

Particularly preferred surfactants for the free radical curable liquid are Silmer® surfactants from SILTECH CORPORATION, such as Silmer® ACR Di-1508.

Preparation of Free Radical Curable Inkjet Inks

The preparation of UV curable inkjet inks is well-known to the skilled person. Preferred methods of preparation are disclosed in paragraphs [0076] to [0085] of WO 2011/069943 (AGFA).

The average particle size and distribution of a colour pigment is an important feature for inkjet inks. The inkjet ink may be prepared by precipitating or milling the pigment in the dispersion medium in the presence of the dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Different types of materials may be used as milling media, such as glasses, ceramics, metals, and plastics. In a preferred embodiment, the grinding media can comprise particles, preferably substantially spherical in shape, e.g. beads consisting essentially of a polymeric resin or yttrium stabilized zirconium oxide beads.

In the process of mixing, milling and dispersion, each process is performed with cooling to prevent build up of heat and as much as possible under light conditions in which actinic radiation has been substantially excluded.

The inkjet ink may contain more than one pigment, and may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary depending upon the specific materials and the intended applications. The contents of the milling mixture comprise the mill grind and the milling media. The mill grind comprises pigment, polymeric dispersant and a liquid carrier. For inkjet inks, the pigment is usually present in the mill grind at 5 to 50 wt %, excluding the milling media. The weight ratio of pigment over polymeric dispersant is preferably 20:1 to 1:2, more preferably 2:1 to 1:1.

The optimal milling time can vary and depends upon the pigment, mechanical means and residence conditions selected, the initial and desired final particle size, etc. In the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general, it is desirable to make the Inkjet inks in the form of a concentrated pigment dispersion, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, colour, hue, saturation density, and print area coverage for a particular application.

Decorative Laminate Panels

A decorative laminate panel according to a preferred embodiment of the present invention includes an inkjet printed decorative image printed with one or more pigmented free radical curable inkjet inks and an adhesive layer of a free radical curable liquid between a first and a second thermoplastic foil, wherein at least one of the first and second thermoplastic foils is a transparent thermoplastic foil; wherein the one or more pigmented free radical curable inkjet inks includes a colour pigment and a polymerizable composition containing 10 to 90 wt % of one or more monofunctional polymerizable compounds; wherein the free radical curable liquid includes a polymerizable composition containing 20 wt % or more of polyfunctional polymerizable compounds and 15 wt % or more of a monofunctional polymerizable compound A or B; wherein all weight percentages wt % are based upon the total weight of the polymerizable composition in the pigmented free radical curable inkjet ink or the free radical curable liquid; wherein monofunctional polymerizable compound A is a compound according to Formula (1):

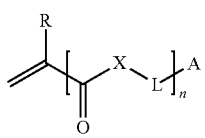

Formula (1)

with R representing hydrogen or a methyl group; X representing an oxygen or an NR'-group; L representing a divalent linking group having no more than 10 carbon atoms; R' being selected from the group consisting of hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group, n representing 0 or 1; and A represents a moiety according to Formula (1A):

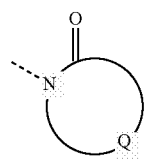

Formula (1A)

with Q representing the necessary atoms to form a five to eight membered ring and the dashed line represents a covalent bond to a carbon atom; wherein monofunctional polymerizable compound B is a compound according to Formula (2):

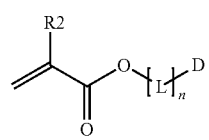

Formula (2)

with R2 representing hydrogen or a methyl group; L representing a divalent linking group having no more than 10 carbon atoms; n representing 0 or 1; and D represents a five to seven membered saturated heterocyclic ring containing a single ether group.

In a particularly preferred embodiment of the decorative laminate, the first and second thermoplastic foils include polyvinylchloride. Such thermoplastic sheets have excellent water resistance and excellent adhesion was achieved using the pigmented free radical curable inkjet inks and the free radical curable liquid.

The decorative panel preferably has a tongue and groove for glue-less interlocking similar decorative panels. By shaping the tongue and groove in a certain way, illustrated merely as an example in FIG. 1, decorative panels can be "clicked" into each other. The polymerizable compositions of the pigmented free radical curable inkjet inks and the free radical curable liquid allowed such shaping without exhibiting cracks in the image.

Usually a CMYK inkjet ink set is used in inkjet printing. It was found that a more accurate reproduction without suffering from metamerism was possible for wood decorative images often used in flooring laminate panels, when the magenta inkjet ink was exchanged for a red inkjet ink. Good adhesion with a red ink is achievable when the pigment is selected from the group consisting of C.I. Pigment Red 122, C.I. Pigment Red 176, C.I. Pigment Red 188, C.I. Pigment Red 207, C.I. Pigment Red 242, C.I. Pigment Red 254, C.I. Pigment Red 272 and mixed crystals thereof.

Decorative Layer

The decorative layer includes the colour pattern printed with the pigmented free radical curable inkjet inks and the adhesive layer applied thereon with the free radical curable liquid. The decorative layer is applied on a thermoplastic foil (see FIGS. 1.A and 1.B) or alternatively can be applied directly on the base layer (see FIGS. 1.C and 1.D).

There is no real restriction on the content of the colour pattern. The colour pattern may also contain information such as text, arrows, logo's and the like. The advantage of inkjet printing is that such information can be printed at low volume without extra cost, contrary to gravure printing.

In a preferred embodiment, the colour pattern is a wood reproduction or a stone reproduction, but it may also be a fantasy or creative pattern, such as an ancient world map or a geometrical pattern, or even a single colour for making, for example, a floor consisting of black and red tiles or a single colour furniture door.

An advantage of printing a wood colour pattern is that a floor can be manufactured imitating besides oak, pine and beech, also very expensive wood like black walnut which would normally not be available for house decoration.

An advantage of printing a stone colour pattern is that a floor can be manufactured which is an exact imitation of a stone floor, but without the cold feeling when walking barefooted on it and that it is easy replaceable over time according to fashion.

Protective Layer

The top surface of the decorative panel is usually the transparent thermoplastic foil (11 in FIG. 2) forming the protective layer. However, additional finishing layers may be applied upon the protective layer.

In a preferred embodiment, an antistatic layer is applied on the protective layer. Techniques to render decorative panels antistatic are well-known in the art of decorative laminates as exemplified by EP 1567334 A (FLOORING IND).

In a particular preferred embodiment, the decorative panel has a polyurethane finishing layer on the protective layer.

The top surface of the decorative panel, i.e. at least the protective layer, is preferably provided with a relief matching the colour pattern, such as for example the wood grain, cracks and knots in a woodprint. Embossing techniques to accomplish such relief are well-known in the art of flooring panels as disclosed by, for example, EP 1290290 A (FLOORING IND), US 2006144004 (UNILIN), EP 1711353 A (FLOORING IND) and US 2010192793 (FLOORING IND).

Most preferably the relief is formed by pressing a digital embossing plate against the transparent thermoplastic foil forming the protective layer during heat-pressing. A digital embossing plate is a plate which comprises elevations that can be used to form a relief on a decorative panel by pressing the digital embossing plate against the protective layer of the decorative panel. The plate is preferably stiff by using metal or hard plastic.

An alternative of a digital embossing plate may be a digital embossing cylinder, which is a cylinder that comprises elevations to form a relief on decorative panels. By pressing and rotating the digital embossing cylinder against the protective layer of the decorative panels, preferably using heat, a relief is applied to the protective layer.

A finishing layer, preferably a polyurethane finishing layer, may include hard particles, like corundum, for preventing scratching of the top surface. The total quantity of hard particles is preferably between 1 g/m² and 100 g/m², preferably 2 g/m² to 50 g/m².

Preferred hard particles are ceramic or mineral particles chosen from the group of aluminium oxide, silicon carbide, silicon oxide, silicon nitride, tungsten carbide, boron carbide, and titanium dioxide, or from any other metal oxide, metal carbide, metal nitride or metal carbonitride. The most preferred hard particles are corundum and so-called Sialon ceramics. In principle, a variety of particles may be used. Of course, also any mixture of the above-mentioned hard particles may be applied.

The amount of hard particles may determined in function of the desired scratch resistance.

Hard particles having an average particle size of between 1 and 200 μm are preferred. Preferably an amount of such particles of between 1 and 40 g/m² is applied above the printed pattern. An amount lower than 20 g/m² can suffice for the lower qualities.

The transparent thermoplastic foil used as protective layer preferably has a thickness of more than 100 μm, more preferably 300 to 700 μm. The thermoplastic foil is transparent so that the colour pattern of the decorative layer can be observed.

Base Layer

In a preferred embodiment, the decorative panel includes a base layer. The base layer provides sufficient rigidness to the decorative panel, so that when e.g. a long rectangular decorative panel bends under its own weight, the panel does not break. For this reason, the base layer is preferably reinforced with fibres.

In a preferred embodiment, the base layer includes substantially polyvinyl chloride and reinforcing fibres. More preferably, the base layer includes substantially polyvinyl chloride and glass fibres.

The base layer may be composed of two foils interposed by a glass fibre fleece.

The base layer may contain mineral. Particularly suitable herein are talc or calcium carbonate (chalk), aluminum oxide, silica. The base layer may include a flame retardant.

In a particular preferred embodiment, the base layer is a plasticized PVC film including 10-50 wt. % of a filler material, preferably mainly calcium carbonate; and/or 2-20 wt. %, preferably 10-20 wt. %, of titanium dioxide, and/or 2-20 wt. %, preferably between 10-20 wt. %, of softening polymers, in particular PLA, PMMA or PVAC.

The base layer may also be a so-called wood plastic composite (WPC), preferably containing one or more polymers or copolymers selected from the group consisting polypropylene, polyethylene and polyvinyl chloride.

When the base layer contains one or more polymers or copolymers selected from the group consisting polypropylene, polyethylene and polyvinyl chloride, then the base layer can be regarded as representing one of the first and second thermoplastic foils in the manufacturing method and the decorative laminate panels of the present invention.

Inkjet Printing Devices

The free radical curable inkjet inks and the free radical curable liquid may be jetted by one or more print heads ejecting small droplets of ink in a controlled manner through nozzles onto an ink-receiver surface, which is moving relative to the print heads.

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However, inkjet print heads used in the present invention is not restricted to piezoelectric inkjet print heads. Other inkjet print heads can be used and include various types, such as a continuous type, electrostatic and acoustic drop on demand types.

A preferred piezoelectric print head is a so called push mode type piezoelectric print head, which has a rather large piezo-element capable of ejecting also more viscous inkjet ink droplets. Such a print head is available from RICOH as the GEN5s print head.

In a preferred embodiment, the piezoelectric print head is a so-called through-flow piezoelectric drop-on-demand print head. Such a print head is available from TOSHIBA TEC as the CF1ou print head. Through-flow print heads are preferred because they enhance the reliability of inkjet printing, which is important in an industrial environment.

In one preferred embodiment, the inkjet printing is performed using a multi-pass inkjet printing device. In such a device, the inkjet print heads scan back and forth in a transversal direction across the moving ink-receiving surface. Bi-directional printing is preferred for obtaining a high areal throughput. The pigmented free radical curable inkjet inks and the free radical curable liquid may be printed either in a concurrent printing mode or in a 2 step printing mode. In the concurrent printing mode, the free radical curable inkjet inks and the free radical curable liquid are jetted and cured simultaneously, while in a 2 step printing mode the free radical curable inkjet inks are first jetted and cured and only after the curing of the free radical curable inkjet inks is the free radical curable liquid jetted and cured on the cured pigmented free radical curable inkjet inks.

The concurrent printing mode has an advantage in productivity, but is somewhat less performant in adhesion than the 2 step printing mode. When superior adhesion results are required, a 2 step printing mode is preferably used.

In another preferred embodiment, the pigmented free radical curable inkjet inks are printed in a so-called "single pass printing process", which can be performed by using page wide inkjet print heads or multiple staggered inkjet print heads which cover the entire width of the ink-receiving surface. In a single pass printing process, the inkjet print heads usually remain stationary and the ink-receiving surface is transported under the inkjet print heads.

The dimensions of decorative laminate panels generally have a width of more than 2 m, which drives up the cost of a single pass inkjet printer, since for each colour a large number of print heads have to be foreseen that cover the entire width of the ink-receiving surface.

Therefore, in a preferred embodiment of the single pass printing process, the free radical curable liquid is not applied by jetting with print heads, but with a cheaper coating technique or printing technology. Preferred coating techniques for applying the free radical curable liquid are selected from the group consisting of spray coating, knife coating, extrusion coating, slide hopper coating and curtain coating. Preferred printing technologies for applying the free radical curable liquid are selected from the group consisting of flexographic printing, gravure printing and offset printing.

In another preferred embodiment of multi-pass inkjet printing, the free radical curable inkjet inks are printed with a multi-pass inkjet device, while the free radical curable liquid is applied by a coating technique or a printing technology. The same coating techniques and printing technologies mentioned for a single pass printing process are preferably used in combination with the multi-pass inkjet device.

In the most preferred embodiment, the inkjet printing of free radical curable inkjet inks, especially UV curable inkjet inks, is performed in a multi-pass printing mode. Multi-pass printing is a technique used to reduce banding in ink-jet printing. Dots of ink, when still in liquid form, tend to run together due to surface tension. This is referred to as coalescence. To print a high quality image, it is important to print individual round dots. But to achieve full saturated colours, the dots must overlap to completely cover the substrate. By only printing a portion of the image data so as to avoid simultaneously printing adjacent dots during each printing cycle, coalescence may be largely avoided. Additionally, by avoiding all horizontal adjacencies, the transverse speed of the printing mechanism can be increased up to two times the rated print speed of the print head. In a preferred embodiment, the number of passes used is to 2 to 6 passes, more preferably no more than 4 passes.

Another advantage of using a multi-pass printing mode is that the UV curable inkjet inks are cured in consecutive passes, rather than in a single pass which would require a curing device with a high UV output. The print head lifetime is also larger for multi pass printing. While in single pass printing one side shooter is sufficient to replace the whole print head, in multi pass printing side shooters and even failings can be tolerated. Also the cost of a multi-pass printer for printing wide format substrates is usually much lower than a single pass inkjet device.

Curing Devices

The free radical curable inkjet inks and liquid are cured by actinic radiation.

In one embodiment, the actinic radiation is provided by an electron beam device. One advantage of electron beam curing is that no photoinitiating system needs to be present in the free radical curable inkjet inks and liquid, making the manufacturing more economical once an investment in e-beam curing has been done.

Preferred e-beam devices are low-energy electron beam sources applying a dose of no more than 100 keV, preferably 50 to 80 keV and using as shielding material preferably 1 to 5 mm of lead or 15 to 25 mm of stainless steel. Most preferably about 3 mm of lead or about 20 mm of stainless steel.

In another more preferred embodiment, the actinic radiation is provided by a UV curing device.

In multi-pass inkjet printing, the curing means may be arranged in combination with the print heads of the inkjet printer, travelling therewith so that the free radical curable composition is exposed to UV curing radiation very shortly after been jetted.

Any ultraviolet light source, as long as part of the emitted light can be absorbed by the photo-initiating system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm
UV-B: 320 nm to 290 nm
UV-C: 290 nm to 100 nm.

Most preferably, the UV curing is performed using UV LEDs having a spectral emission in the range of 345-420 nm, more preferably between 360 and 400 nm. The latter UV LEDs have a very long life time without decreasing light output, which is common in mercury lamps. The use of these UV LED sources also enhances the reliability of inkjet printing in an industrial environment.

For facilitating UV curing, the inkjet printer may include one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are preferably maintained as low as 200 ppm, but may be in the range of 200 ppm to 1200 ppm.

EXAMPLES

Materials

All materials used in the following examples were ALL obtained from standard sources such as Sigma-Aldrich (Belgium) and Acros (Belgium) unless otherwise specified.

PB15:4 is an abbreviation used for a C.I. Pigment Blue 15:4 pigment, available as Hostaperm® Blue P-BFS from CLARIANT.

S35000 is an abbreviation used for SOLSPERSE™ 35000, a polyethyleneimine-polyester hyperdispersant from LUBRIZOL.

DB162 is an abbreviation used for the polymeric dispersant Disperbyk® 162 available from BYK CHEMIE GMBH whereof the solvent mixture of 2-methoxy-1-methylethylacetate, xylene and n-butylacetate was removed. The polymeric dispersant is a polyester-polyurethane dispersant on the basis of caprolacton and toluene diisocyanate having an amine value of 13 mg KOH/g, a Mn of about 4,425 and a Mw of about 6,270.

EFKA is a polyacrylate dispersant available as Efka® 7701 from BASF.

PCA-2 is N-vinyl caprolactam available from BASF BELGIUM, NV.

PCA-6 was prepared in the manner as described in preparation example 1 on pages 21-22 of WO 2018/146259 (BASF).

PCB-1 is tetrahydrofurfuryl acrylate available as Sartomer® SR285 from ARKEMA.

CE-1 is (3-ethyl-3-oxetanyl)methyl acrylate available as OXE-10 from KOWA EUROPE GMBH.

IBOA is isobornylacrylate available as Sartomer® SR506D from ARKEMA.

IDA is isodecyl acrylate available as Sartomer® SR395 from SARTOMER.

PEA is 2-phenoxyethyl acrylate available as Sartomer® SR339C from ARKEMA.

CTFA is cyclic trimethylolpropane formal acrylate available as Sartomer® SR531 from ARKEMA.

SR504D is ethoxylated nonyl-phenol acrylate available as Sartomer® SR506D from ARKEMA.

TBCH is 4-tert.butylcyclohexylacrylate available under the trade name of Sartomer® CD217 from ARKEMA.

ACMO is acryloyl morpholine available from RAHN.

SR833S is tricyclodecane dimethanol diacrylate available as Sartomer® SR833s from ARKEMA.

DPGDA is dipropyleneglycoldiacrylate available as Laromer® DPGDA from BASF.

HDDA is 1,6 hexanediol diacrylate available as Sartomer® SR238 from ARKEMA.

VEEA is 2-(2'-vinyloxyethoxy)ethyl acrylate, a difunctional monomer available from NIPPON SHOKUBAI, Japan.

MPDA is 3-methyl-1,6-pentanediyl diacrylate available as Sartomer® SR341 from ARKEMA.

TMPTA is trimethylolpropane triacrylate available as Sartomer® SR351 from ARKEMA.

SR9035 is an ethoxylated (15) trimethylolpropane triacrylate containing fifteen ethoxy units having a molecular weight of 956 and available as Sartomer® SR9035 from SARTOMER.

G4215 is an aliphatic polyester urethane acrylate available as Genomer® 4215 from RAHN.

G1122 is a monofunctional urethane acrylate available as Genomer® 1122 from RAHN.

CN963B80 is a urethane diacrylate available as Sartomer® CN963B80 from ARKEMA.

CN3755 is a diacrylated co-initiator available as Sartomer® CN3755 from ARKEMA.

CN3715 is a diethylamine Michael adduct of ethoxylated trimethylol propane triacrylate, a co-initiator available as Sartomer® CN3715 from ARKEMA.

TPO is 2,4,6-Trimethylbenzoyl-diphenyl-phosphineoxide available as Omnirad® TPO by IGM RESINS.

TPO-L is an acylphosphine oxide photoinitiator available as Omnirad® TPO-L from IGM RESINS.

BAPO is a bisacylphosphineoxide photo-initiator available as Omnirad® 819 from IGM RESINS.

ITX is an isomeric mixture of 2- and 4-isopropylthioxanthone available as Omnirad® ITX from IGM RESINS.

BP is available as Omnirad™ BP from IGM RESINS.

DETX is a thioxanthone photo-initiator available as Genocure® DETX from RAHN.

EPD is ethyl 4-dimethylaminobenzoate available as Genocure® EPD from RAHN AG.

EHA is 2-ethylhexyl 4-dimethylaminobenzoate available as Genocure® EHA from RAHN.

INHIB is a mixture forming a polymerization inhibitor having a composition according to Table 4.

TABLE 4

| Component | wt % |
|---|---|
| DPGDA | 82.4 |
| p-methoxyphenol | 4.0 |
| BHT | 10.0 |
| Cupferron ™ AL | 3.6 |

BHT is an abbreviation for 2,6-di-tert.butyl-4-methylphenol (CASRN128-37-0) from ALDRICH CHEMICAL CO.

Cupferron® AL is aluminum N-nitrosophenylhydroxylamine from WAKO CHEMICALS LTD.

UV10 is 4-hydroxy-2,2,6,6-tetramethylpiperidinooxy sebacate available as Irgastab® UV10 from BASF.

UV3510 is a polyethermodified polydimethylsiloxane wetting agent available as BYK™ UV3510 from BYK CHEMIE GMBH.

T410 is a surfactant available as Tegoglide™ 410 from EVONIK.

L7500 is a silicone surfactant available as Coatosil® L7500 from MOMENTIVE PERFORMANCES.

SILMER is a difunctional silicone acrylate pre-polymer available as Silmer® ACR Di-1508 from SILTECH CORPORATION.

SILWAX is a polysiloxane surfactant available as Silwax® B116 from SILTECH CORPORATION.

P2 is an 80 µm thick opaque white polyvinyl chloride foil.

C3 is a 500 µm thick transparent polyvinyl chloride foil.

Measurement Methods

1. Adhesion

The adhesion was determined by testing the peel strength. The test is done using a 180° geometry and following the EN431:1994 standard and by using an Instron® tensile machine. The tensile machine pulls the sample at a constant velocity of 100 mm/mi) and the force needed to peel the sample at this velocity is plotted as a function of the distance. The obtained result is the average load/width between 10 and 80 mm. The result is reported in N/5 cm.

A peel strength of minimum 50 N/5 cm is required for good adhesion. However, commercially superior products are required to exhibit an adhesion of at least 60 N/5 cm or even 70 N/5 cm.

2. Viscosity

The viscosity of the samples was measured with a HAAKE Rotovisco 1 rotational rheometer at 45° C. and at a shear rate of 1000 $s^{-1}$.

3. Tackiness

The tackiness of a sample was tested by rubbing a clean cotton stick on the surface after curing. Depending on if a mark was left by the cotton stick, the tackiness was evaluated according to Table 5.

TABLE 5

| Criterion | Visual interpretation |
|---|---|
| Yes | A mark is visible by the cotton stick. Sample is considered to be tacky. |
| No | No mark visible. No Tackiness. |

Example 1

This example illustrates the effect on adhesion by the amount of a monofunctional polymerizable compound A or B in the polymerizable composition of the free radical curable liquid.

Preparation of Cyan Pigment Dispersion

A cyan pigment dispersion was made by mixing the components according to Table 6 for 30 minutes using a DISPERLUX™ disperser from DISPERLUX S.A.R.L., Luxembourg. The dispersion was then milled using a Bachofen DYNOMILL ECM mill filled with 0.4 mm yttrium stabilized zirconia beads ("high wear resistant zirconia grinding media" from TOSOH Co.). The mixtures were circulated over the mill for 2 hours. After milling, the pigment dispersions were discharged over a 1 µm filter into a vessel.

TABLE 6

| Component | wt % |
|---|---|
| PB15:4 | 16.00 |
| S35000 | 16.00 |
| INHIB | 1.00 |
| DPGDA | 67.00 |

Preparation of Free Radical Curable Inkjet Ink C-1

A cyan free radical UV curable inkjet ink C-1 was prepared by mixing the cyan pigment dispersion and the components according to Table 7. The weight percentage is based on the total weight of the inkjet ink.

TABLE 7

| wt % of compound: | Ink C-1 |
|---|---|
| PB15:4 | 2.50 |
| S35000 | 2.50 |
| PCA-2 | 9.22 |
| PCB-1 | 13.15 |
| IBOA | 17.65 |
| PEA | 13.04 |
| IDA | 4.66 |
| DPGDA | 15.62 |
| CN963B80 | 5.30 |
| CN3755 | 7.50 |
| TPO | 2.95 |
| BAPO | 2.25 |
| ITX | 2.00 |
| INHIB | 0.31 |
| UV10 | 0.35 |
| L7500 | 1.00 |

The polymerizable composition of the cyan free radical UV curable inkjet ink C-1 contains 67 wt % of monofunctional polymerizable compounds based on the total weight of inkjet ink.

Preparation of Free Radical Curable Liquids L-1 to L-8

The free radical curable liquids L-1 to L-8 were prepared by mixing the components according to Table 8. All amounts of the compounds are expressed in weight percentages based on the total weight of the free radical curable liquid.

TABLE 8

| | wt % of compound | | | | | | | |
|---|---|---|---|---|---|---|---|---|
| | L-1 | L-2 | L-3 | L-4 | L-5 | L-6 | L-7 | L-8 |
| PCA-2 | 0.0 | 10.0 | 20.0 | 30.0 | 44.5 | 60.0 | 70.0 | 80.0 |
| SR833S | 88.9 | 78.9 | 68.9 | 58.9 | 44.4 | 28.9 | 18.9 | 8.9 |
| TPO | 5.0 | 5.0 | 5.0 | 5.0 | 5.0 | 5.0 | 5.0 | 5.0 |
| TPO-L | 5.0 | 5.0 | 5.0 | 5.0 | 5.0 | 5.0 | 5.0 | 5.0 |
| INHIB | 1.0 | 1.0 | 1.0 | 1.0 | 1.0 | 1.0 | 1.0 | 1.0 |
| SILMER | 0.1 | 0.1 | 0.1 | 0.1 | 0.1 | 0.1 | 0.1 | 0.1 |
| Total | 100.0 | 100.0 | 100.0 | 100.0 | 100.0 | 100.0 | 100.0 | 100.0 |

Manufacturing of Laminate

The cyan free radical curable inkjet ink C-1 was applied on the matt side of a thermoplastic foil P2 at a thickness of 10 µm and cured using a Fusion DRSE-120 conveyer equipped with 12 W 395 nm LED at a speed of 20 m/min. The maximum output of the lamp was 1.05 J/cm$^2$ and a peak intensity of 5.6 W/cm$^2$.

Then each of the free radical curable liquids L-1 to L-8 was coated at a thickness of 10 µm on a thermoplastic foil P2 provide with the cured ink C-1 and cured using the Fusion DRSE-120 conveyer equipped with 12 W 395 nm LED at a speed of 20 m/min.

Each of the thermoplastic foils P2 provided with the cured ink C-1 and a cured free radical curable liquid was then combined with a transparent thermoplastic foil C3 by having the ink layer on the foil P2 facing the transparent thermoplastic foil C3. As another comparison, a thermoplastic foils P2 provided with the cured ink C-1, but without any cured free radical curable liquid, was combined with a transparent thermoplastic foil C3 by having the ink layer on the foil P2 facing the transparent thermoplastic foil C3. The assembly of foils P2 and C3 was then heat pressed for 160 seconds at a temperature of 160° C. and a pressure of 14 bar in a OLAH6 laminator from OASYS.

Evaluation and Results

The heat-pressed samples were evaluated for adhesion (peel strength). The results are shown in Table 9. The measured viscosity of the free radical curable liquids is also shown.

TABLE 9

| Free Radical Curable Liquid | wt % polymerizable compounds based on polymerizable composition | | Viscosity at 45° C. (mPa · s) | Peel Strength (N/5 cm) |
|---|---|---|---|---|
| | Monofunctional (PCA-2) | Polyfunctional (SR833S & DPGDA) | | |
| None | — | — | — | <20 |
| L-1 | 0 | 100 | 37 | <20 |
| L-2 | 11 | 89 | 26 | 45 |
| L-3 | 22 | 78 | 18 | 60 |
| L-4 | 33 | 67 | 13 | 66 |
| L-5 | 50 | 50 | 9 | 73 |
| L-6 | 67 | 33 | 6 | 70 |
| L-7 | 78 | 22 | 5 | 69 |
| L-8 | 89 | 11 | 4 | <20 |

From Table 9, it is immediately apparent that insufficient adhesion was obtained with the free radical curable liquids L-1, L-2 and L-8. The free radical curable liquids L-1 and L-2 contain less than 15 wt % of the monofunctional polymerizable compound PCA-2 based on the polymerizable composition, while the free radical curable liquid L-8 contains less than 15 wt % of a polyfunctional polymerizable compound.

The desired viscosity of 5 to 15 mPa·s at 45° C. for jetting the free radical curable liquid is available with the free radical curable liquids L-4 to L-7. The free radical curable liquid L-3, also giving satisfactory adhesion results, can still be jetted at a slightly higher temperature than 45° C.

Example 2

This example illustrates the effect on adhesion of the amount of polyfunctional polymerizable compounds and monofunctional polymerizable compound A or B in the polymerizable composition of the free radical curable liquid.

Free Radical Curable Inkjet Ink

The same cyan free radical UV curable inkjet ink C-1 of Example 1 was also used in Example 2.

Preparation of Free Radical Curable Liquids

The free radical curable liquids L-9 to L-13 were prepared by mixing the components according to Table 10. All amounts of the compounds are expressed in weight percentages based on the total weight of the free radical curable liquid.

TABLE 10

| | wt % of compound: | | | |
|---|---|---|---|---|
| | L-9 | L-10 | L-11 | L-12 |
| PCA-6 | 0.00 | 20.00 | 30.00 | 44.46 |
| CE-1 | 44.46 | 24.46 | 14.46 | 0.00 |
| SR833S | 44.44 | 44.44 | 44.44 | 44.44 |
| TPO | 5.00 | 5.00 | 5.00 | 5.00 |
| TPO-L | 5.00 | 5.00 | 5.00 | 5.00 |
| INHIB | 1.00 | 1.00 | 1.00 | 1.00 |
| SILMER | 0.10 | 0.10 | 0.10 | 0.10 |
| Total | 100.00 | 100.00 | 100.00 | 100.00 |

Manufacturing of Laminate

The laminates were prepared in the same way as in Example 1, except that now the free radical curable liquids L-9 to L-12 were used instead of the free radical curable liquids L-1 to L-8.

Evaluation and Results

The heat-pressed samples were evaluated for adhesion (peel strength). The results are shown in Table 11. The measured viscosity of the free radical curable liquids is also shown.

TABLE 11

| Free Radical Curable Liquid | wt % polymerizable compounds based on polymerizable composition | | | Viscosity at 45° C. (mPa · s) | Peel Strength (N/5 cm) |
|---|---|---|---|---|---|
| | Monofunctional | | Polyfunctional | | |
| | PCA-6 | CE-1 | SR833S & DPGDA | | |
| L-9 | 0 | 50 | 50 | 9 | 47 |
| L-10 | 22 | 28 | 50 | 11 | 60 |
| L-11 | 34 | 16 | 50 | 13 | 72 |
| L-12 | 50 | 0 | 50 | 18 | 73 |

Table 11 shows that insufficient adhesion was obtained with the free radical curable liquid L-9, which contains no monofunctional polymerizable compound A or B. The compound CE-1 is similar to a monofunctional polymerizable compound B, except that a four-membered instead of a five to seven membered saturated heterocyclic ring containing a single ether group is present. Good adhesion is obtained with the free radical curable liquids L-10 to L-12 that contain a sufficient amount of a monofunctional polymerizable compound A and a polyfunctional polymerizable compound.

The desired viscosity of 5 to 15 mPa·s at 45° C. for jetting the free radical curable liquid is available with the free radical curable liquids L-10 and L-11. The free radical curable liquid L-12 giving satisfactory adhesion results can be jetted at a higher temperature than 45° C. or alternatively, part of the higher viscous SR833S (140 mPa·s at 25° C.) can be replaced by the lower viscous DPGDA (9 mPa·s at 25° C.).

Example 3

This example illustrates the influence on adhesion of other polymerizable compounds in the free radical curable liquid.

Free Radical Curable Inkjet Ink

The same cyan free radical UV curable inkjet ink C-1 of Example 1 was also used in Example 3.

Preparation of Free Radical Curable Liquids

The free radical curable liquids COMP-1 to COMP-5 and INV-1 to INV-14 were prepared by mixing the components according to Table 12 to Table 14. All amounts of the compounds are expressed in weight percentages based on the total weight of the free radical curable liquid.

Manufacturing of Laminate

The laminates were prepared in the same way as in Example 1, except that now the free radical curable liquids COMP-1 to COMP-5 and INV-1 to INV-14 were used instead of the free radical curable liquids L-1 to L-8.

Evaluation and Results

The heat-pressed samples were evaluated for adhesion (peel strength). The results are shown in Table 15. The tackiness of the free radical curable liquids is also shown.

TABLE 12

|  | wt % of compound | | | | | | | |
| --- | --- | --- | --- | --- | --- | --- | --- | --- |
|  | COMP-1 | COMP-2 | COMP-3 | COMP-4 | COMP-5 | INV-1 | INV-2 | INV-3 |
| PCA-2 |  |  |  |  |  | 21.38 | 21.38 | 21.45 |
| CE-1 | 37.90 |  |  |  |  | 21.38 | 21.38 |  |
| CTFA |  | 42.90 |  |  |  |  |  | 21.45 |
| HDDA |  |  | 42.90 |  |  |  |  |  |
| IBOA | 10.00 |  |  | 42.90 |  |  |  |  |
| ACMO |  |  |  |  | 42.90 |  |  |  |
| SR833S | 39.00 | 44.00 | 44.00 | 44.00 | 44.00 | 44.15 | 44.00 | 44.00 |
| CN3755 | 4.00 | 4.00 | 4.00 | 4.00 | 4.00 | 4.00 | 4.00 | 4.00 |
| TPO | 8.00 | 8.00 | 8.00 | 8.00 | 8.00 | 8.00 | 8.00 | 8.00 |
| INHIB | 1.00 | 1.00 | 1.00 | 1.00 | 1.00 | 1.00 | 1.00 | 1.00 |
| SILMER | 0.10 | 0.10 | 0.10 | 0.10 | 0.10 | 0.10 | 0.25 | 0.10 |
| Total wt % | 100.00 | 100.00 | 100.00 | 100.00 | 100.00 | 100.00 | 100.00 | 100.00 |
| wt % Polymerizable composition | 91.72 | 91.72 | 91.72 | 91.72 | 91.72 | 91.72 | 91.57 | 91.72 |

TABLE 13

|  | wt % of compound | | | | | | | |
| --- | --- | --- | --- | --- | --- | --- | --- | --- |
|  | INV-4 | INV-5 | INV-6 | INV-7 | INV-8 | INV-9 | INV-10 | INV-11 |
| PCA-2 | 21.45 | 21.45 | 21.45 | 42.90 | 27.90 | 27.90 | 27.90 | 37.90 |
| HDDA | 21.45 |  |  |  |  |  |  |  |
| IBOA |  | 21.45 |  |  | 15.00 |  | 7.50 |  |
| ACMO |  |  | 21.45 |  |  | 15.00 | 7.50 |  |
| SR833S | 44.00 | 44.00 | 44.00 | 44.00 | 44.00 | 44.00 | 44.00 | 49.00 |
| CN3755 | 4.00 | 4.00 | 4.00 | 4.00 | 4.00 | 4.00 | 4.00 | 4.00 |
| TPO | 8.00 | 8.00 | 8.00 | 8.00 | 8.00 | 8.00 | 8.00 | 8.00 |
| INHIB | 1.00 | 1.00 | 1.00 | 1.00 | 1.00 | 1.00 | 1.00 | 1.00 |
| SILMER | 0.10 | 0.10 | 0.10 | 0.10 | 0.10 | 0.10 | 0.10 | 0.10 |
| Total wt % | 100.00 | 100.00 | 100.00 | 100.00 | 100.00 | 100.00 | 100.00 | 100.00 |
| wt % Polymerizable composition | 91.72 | 91.72 | 91.72 | 91.72 | 91.72 | 91.72 | 91.72 | 91.72 |

TABLE 14

| wt % of compound | INV-12 | INV-13 | INV-14 |
| --- | --- | --- | --- |
| PCA-2 | 27.90 | 47.90 | 37.90 |
| IBOA | 10.00 |  | 10.00 |
| SR833S | 49.00 | 39.00 | 39.00 |
| CN3755 | 4.00 | 4.00 | 4.00 |
| TPO | 8.00 | 8.00 | 8.00 |
| INHIB | 1.00 | 1.00 | 1.00 |
| SILMER | 0.10 | 0.10 | 0.10 |
| Total wt % | 100.00 | 100.00 | 100.00 |
| wt % Polymerizable composition | 91.72 | 91.72 | 91.72 |

TABLE 15

| Free Radical Curable Liquid | wt % polymerizable compounds based on polymerizable composition | | | Peel Strength (N/5 cm) | Tackiness |
| --- | --- | --- | --- | --- | --- |
|  | Monofunctional | | Polyfunctional |  |  |
|  | A or B | Other |  |  |  |
| COMP-1 | — | 52.2 | 47.8 | 40 | N |
| COMP-2 | — | 46.8 | 53.2 | 45 | Y |
| COMP-3 | — | — | 100.0 | 38 | Y |
| COMP-4 | — | 46.8 | 53.2 | 20 | Y |
| COMP-5 | — | 46.8 | 53.2 | 38 | N |
| INV-1 | 23.3 | 23.3 | 53.4 | 68 | N |
| INV-2 | 23.3 | 23.3 | 53.3 | 64 | N |

TABLE 15-continued

| Free Radical Curable Liquid | wt % polymerizable compounds based on polymerizable composition | | | Peel Strength (N/5 cm) | Tackiness |
|---|---|---|---|---|---|
| | Monofunctional | | Polyfunctional | | |
| | A or B | Other | | | |
| INV-3 | 23.4 | 23.4 | 53.2 | 55 | N |
| INV-4 | 23.4 | — | 76.6 | 50 | N |
| INV-5 | 23.4 | 23.4 | 53.2 | 59 | N |
| INV-6 | 23.4 | 23.4 | 53.2 | 65 | N |
| INV-7 | 46.8 | — | 53.2 | 73 | N |
| INV-8 | 30.4 | 16.4 | 53.2 | 72 | N |
| INV-9 | 30.4 | 16.4 | 53.2 | 66 | N |
| INV-10 | 30.4 | 16.4 | 53.2 | 71 | N |
| INV-11 | 41.3 | — | 58.7 | 58 | N |
| INV-12 | 30.4 | 10.9 | 58.7 | 65 | N |
| INV-13 | 52.2 | — | 47.8 | 64 | N |
| INV-14 | 41.3 | 10.9 | 47.8 | 78 | N |

The free radical curable liquids COMP-1 to COMP-5 were not capable of achieving good adhesion, even though some were tacky. The latter would be an advantage according to EP 3173229 A (TARKETT), which discloses that incompletely cured UV curable ink improves the adhesion. In an industrial environment, UV cured compositions that exhibit no tackiness are preferred for reliable manufacturing without vulnerability to dust or scratches.

The free radical curable liquids INV-1 and INV-2 show that increasing the amount surfactant negatively impacts the adhesion. A surfactant amount of no more than 0.3 wt % based on the ink is therefore preferred, since a desired surface tension for good spreading can be obtained by such concentration.

The comparative example 2 includes CTFA which differs from a monofunctional polymerizable compound B according to Formula (2) in that it contains two ether functions in a six membered saturated heterocyclic ring. The inventive example INV-3 shows that CTFA can nevertheless be included in a free radical curable liquid when a polymerizable compound A or B is present (here: PCA-2).

Comparison of examples COMP-3 to COMP-5 with INV-4 to INV-14 show that different other monofunctional and polyfunctional polymerizable compounds may be included in the free radical curable liquid with acceptable effects on adhesion, as long as sufficient monofunctional polymerizable compound A or B and polyfunctional polymerizable compounds is present.

Example 4

This example illustrates the effect on adhesion of the amount of polyfunctional polymerizable compounds and monofunctional polymerizable compound A or B in the polymerizable composition of the free radical curable liquid.

Free Radical Curable Inkjet Ink

The same cyan free radical UV curable inkjet ink C-1 of Example 1 was also used in Example 4.

Preparation of Free Radical Curable Liquids

The free radical curable liquids COMP-6 and INV-15 to INV-17 were prepared by mixing the components according to Table 16. All amounts of the compounds are expressed in weight percentages based on the total weight of the free radical curable liquid.

TABLE 16

| | wt % of compound: | | | |
|---|---|---|---|---|
| | COMP-6 | INV-15 | INV-16 | INV-17 |
| PCB-1 | 88 | 43 | 33 | 38 |
| G4215 | | | 10 | 10 |
| SR833S | | 45 | 45 | 40 |
| CN3715 | 4 | 4 | 4 | 4 |
| TPO | 8 | 8 | 8 | 8 |
| Total | 100 | 100 | 100 | 100 |
| wt % of Polymerizable composition | 92 | 92 | 92 | 92 |

Manufacturing of Laminates

The laminates were prepared in the same way as in Example 1, except that now the free radical curable liquids COMP-6 and INV-15 to INV-17 were used instead of the free radical curable liquids L-1 to L-8.

Evaluation and Results

The heat-pressed samples were evaluated for adhesion (peel strength). The results are shown in Table 17. The tackiness of the free radical curable liquids is also shown.

TABLE 17

| Free Radical Curable Liquid | wt % polymerizable compounds based on polymerizable composition | | | Peel Strength (N/5 cm) | Tackiness |
|---|---|---|---|---|---|
| | Monofunctional | | Polyfunctional | | |
| | B | Other | | | |
| COMP-6 | 96 | 0 | 4 | 29 | Y |
| INV-15 | 47 | 0 | 53 | 50 | N |
| INV-16 | 36 | 11 | 53 | 53 | N |
| INV-17 | 41 | 11 | 48 | 51 | N |

From Table 17, it can be seen that the free radical curable liquid COMP-6 fails to achieve good adhesion in contrast to the free radical curable liquids INV-15 to INV-17. The latter three free radical curable liquids also did not exhibit any tackiness.

Example 5

This example illustrates the effect on adhesion of the amount of monofunctional and polyfunctional polymerizable compounds in the polymerizable composition of the free radical curable inkjet inks.

Preparation of Free Radical Curable Inkjet Inks

Cyan pigment dispersions were prepared in a similar way as explained for Example 1 using different types of dispersants. These cyan pigment dispersions were then used to compose free radical curable inkjet inks that exhibited good UV curing and reliable jetting properties. The cyan free radical UV curable inkjet inks COMP-7, COMP-8 and INV-18 to INV-24 were prepared by mixing the cyan pigment dispersions and the components according to Table 18. The weight percentage is based on the total weight of the inkjet inks.

TABLE 18

| wt % of compound | COMP 7 | COMP 8 | INV 18 | INV 19 | INV 20 | INV 21 | INV 22 | INV 23 | INV 24 |
|---|---|---|---|---|---|---|---|---|---|
| PB15:4 | 3.00 | 2.50 | 2.00 | 1.80 | 2.50 | 2.50 | 3.10 | 2.50 | 2.25 |
| DB162 | 3.00 | | 0.80 | 0.60 | | 2.50 | 2.06 | 2.50 | |
| EFKA | | 2.50 | | | | | | | 1.50 |
| S35000 | | | | | 2.50 | | | | |
| G1122 | | | | | | | | 12.38 | |
| PCA-2 | | 16.64 | 13.40 | 12.00 | 9.90 | 9.22 | 13.40 | | 13.40 |
| PCB-1 | | | | | 14.12 | 13.15 | | | |
| SR504D | | 9.16 | | | | | | | |
| ACMO | | | | | | | 17.80 | | |
| IBOA | | 33.29 | 26.70 | 22.00 | 18.95 | 17.65 | | | |
| PEA | | 14.41 | 38.52 | 36.30 | 16.35 | 18.84 | | | |
| TBCH | | | | | | | | 13.36 | |
| IDA | | | 5.50 | 5.00 | 4.66 | | | | 10.48 |
| VEEA | | | | | | | | 24.38 | 51.40 |
| DPGDA | 36.20 | 0.82 | 0.92 | 5.86 | 10.47 | 15.72 | 19.28 | 23.91 | 5.58 |
| MPDA | 24.50 | | 0.73 | 1.17 | | | 20.00 | | |
| TMPTA | 14.00 | | | | | | 11.00 | | |
| SR9035 | | | | | | | | 3.00 | |
| CN963B80 | | 3.00 | 4.50 | 6.00 | 4.00 | | | 2.50 | |
| CN3755 | | 3.00 | 4.20 | 2.00 | 7.50 | 7.00 | 5.00 | 7.50 | 7.00 |
| ITX | | 2.00 | | | 2.00 | 2.00 | | | 2.00 |
| DETX | 4.00 | | | | | | 2.00 | | |
| TPO | | 2.95 | 7.35 | 5.35 | 2.95 | 2.95 | 2.95 | | 2.95 |
| TPO L | 5.00 | | | | | | | 4.50 | |
| BAPO | 4.00 | 2.25 | | | 2.25 | 2.25 | 2.00 | 2.25 | 2.00 |
| EPD | 5.00 | | | | | | | | |
| EHA | | 3.00 | | | | | | | |
| BP | | 4.00 | | | | | | | |
| INHIB | 0.20 | 0.18 | 0.08 | 0.12 | 0.16 | 0.21 | 0.16 | 0.21 | 0.15 |
| UV10 | 1.00 | | 0.30 | 0.30 | 0.35 | 0.35 | 0.25 | | 0.30 |
| UV3510 | 0.10 | | | | | | 1.00 | | |
| T410 | | 0.30 | | | | | | | |
| Silwax | | | 0.50 | | | | | | |
| L7500 | | | | 1.00 | 1.00 | 1.00 | | 1.00 | 1.00 |
| Total | 100.00 | 100.00 | 100.00 | 100.00 | 100.00 | 100.00 | 100.00 | 100.00 | 100.00 |
| wt % Polymerizable composition | 74.86 | 80.47 | 89.04 | 90.92 | 86.42 | 86.41 | 86.61 | 87.21 | 87.97 |

Preparation of Free Radical Curable Liquid

The free radical curable liquid FRCL was prepared by mixing the components according to Table 19. All amounts of the compounds are expressed in weight percentages based on the total weight of the free radical curable liquid.

TABLE 19

| wt % of compound: | FRCL |
|---|---|
| PCA-2 | 37.9 |
| IBOA | 10.0 |
| TPO | 8.0 |
| SR833S | 39.0 |
| CN3755 | 4.0 |
| INHIB | 1.0 |
| SILMER | 0.1 |

Manufacturing of Laminates

The laminates were prepared in the same way as in Example 1, except that now the cyan free radical UV curable inkjet inks COMP-7, COMP-8 and INV-18 to INV-24 and the free radical curable liquid FRCL were used instead of the free radical curable inkjet ink C-1 respectively the free radical curable liquids L-1 to L-8.

Evaluation and Results

The heat-pressed samples were evaluated for adhesion (peel strength). The results are shown in Table 20.

TABLE 20

| Inkjet Ink | Wt % of polymerizable compounds on polymerizable composition | | Adhesion (N/5 cm) |
|---|---|---|---|
| | Monofunctional | Polyfunctional | |
| COMP-7 | 0 | 100 | 9 |
| COMP-8 | 91 | 9 | 12 |
| INV-18 | 88 | 12 | 52 |
| INV-19 | 83 | 17 | 59 |
| INV-20 | 74 | 26 | 69 |
| INV-21 | 74 | 26 | 69 |
| INV-22 | 36 | 64 | 51 |
| INV-23 | 30 | 70 | 54 |
| INV-24 | 27 | 73 | 57 |

From Table 20, it should be clear that it is not possible to achieve good adhesion with the inkjet inks COMP-7 and COMP-8, which have a polymerizable composition that does not contain 10 to 90 wt % of one or more monofunctional polymerizable compounds. The best adhesion results are obtained when the polymerizable composition of the free radical curable inkjet ink contains 40 to 80 wt % of one or more monofunctional polymerizable compounds.

By comparing the adhesion results of the free radical curable inkjet ink INV-24 with those of free radical curable inkjet inks INV-22 and INV-23, a deterioration can be observed when including polyfunctional polymerizable compounds having more than two polymerizable groups in the inkjet ink.

Example 6

This example illustrates a practical implementation with an inkjet printer. The Examples 1 to 5 were performed using a bar coater because it was faster and cheaper to do so.

Free Radical Curable Inkjet Inks

A commercial CMYK inkjet ink set Anuvia® 1550 from AGFA was used. All the inkjet inks are pigmented free radical curable inkjet inks including a colour pigment and a polymerizable composition containing monofunctional polymerizable compounds in the particularly preferred range 40 to 80 wt % based on the total weight of the polymerizable composition.

Preparation of Free Radical Curable Liquid

The free radical curable liquid FRCL-2 was prepared by mixing the components according to Table 21. All amounts of the compounds are expressed in weight percentages based on the total weight of the free radical curable liquid.

TABLE 21

| wt % of compound: | FRCL-2 |
|---|---|
| PCA-2 | 40.0 |
| IBOA | 10.0 |
| TPO | 5.9 |
| SR833S | 40.0 |
| CN3755 | 3.0 |
| INHIB | 1.0 |
| SILMER | 0.1 |

The viscosity measured at 45° C. and at a shear rate of 1,000 s$^{-1}$ was 10 mPa·s.

Manufacturing of Laminates

An image was composed including a photograph of a landscape, a photograph of two children and rectangles of cyan, magenta, yellow, black, red, blue and green colour.

The image was printed on an 80 μm thick opaque white polyvinyl chloride foil P2 using an Anapurna® H 2050i LED from AGFA and the inkjet ink set Anuvia® 1550. The printing parameters were set to: C-speed=5/F-speed=1/Direction=Uni/UV=Both/UV mode=Normal/UV Power L=40%/UV Power R=40%/Print mode=Quamity-No mask_Single strike and Quality=720×720dpi. The size of the photographs and the rectangles in the printed image were large to perform a peel strength test on each of them.

The free radical curable liquid FRCL-2 was applied in different ways. In sample IJ-1, a bar coating of the free radical curable liquid FRCL-2 at a thickness of 10 μm was performed on top of the inkjet printed image. This allows a direct comparison with the results of Examples 1 to 5.

In samples IJ-2 and IJ-3, the printing of the free radical curable inkjet inks and the free radical curable liquid FRCL-2 was performed at the same time. While in sample IJ-2 the printed image was fully covered (100%) by the radical curable liquid FRCL-2, the printed image in sample IJ-3 was partly not covered by the radical curable liquid FRCL-2, so that in lamination the ink would contact a second thermoplastic sheet C2 for 25% of the surface area.

In samples IJ-4 and IJ-5, the printing took place in two steps. First the free radical curable inkjet inks were jetted and cured and thereafter the printed image was again introduced in the inkjet printer and the radical curable liquid FRCL-2 was jetted and cured on the printed image. In the same way as for samples IJ-2 and IJ-3, the samples IJ-4 and IJ-5 were printed with the radical curable liquid FRCL-2 to fully respectively partly (75%) cover the inkjet printed image.

Each of the samples IJ-1 to IJ-5 was then combined with a transparent thermoplastic foil C3 by having the image on the foil P2 facing the transparent thermoplastic foil C3. The assembly of foils P2 and C3 was then heat pressed for 40 seconds at a temperature of 160° C. and a pressure of 14 bar.

Evaluation and Results

The heat-pressed samples IJ-1 to IJ-5 were evaluated for adhesion (peel strength). The results of the peeling test on the photographs and the coloured rectangles were averaged and are shown in Table 22.

TABLE 22

| Sample | Application method FRCL-2 | Peeling test Average (N/5 cm) |
|---|---|---|
| IJ-1 | Bar coating | 72 |
| IJ-2 | Concurrent printing (100% coverage) | 69 |
| IJ-3 | Concurrent printing (75% coverage) | 62 |
| IJ-4 | 2 step printing (100% coverage) | 76 |
| IJ-5 | 2 step printing (75% coverage) | 63 |

From Table 22, it can be seen that the results from bar coating can be compared with those obtained by an actual inkjet printing experiment.

It can also be seen that the adhesion results for a 2 step printing process are slightly better than that of concurrent printing.

Lastly, it can be seen that the adhesion deteriorates if pigmented free radical curable inkjet inks are not fully covered by free radical curable liquid.

REFERENCE SIGNS LIST

TABLE 23

| 1 | Decorative panel |
|---|---|
| 2 | Base layer |
| 3 | Tongue |
| 4 | Groove |
| 5 | Transparent or opaque thermoplastic foil |
| 6 | Transparent thermoplastic foil |
| 7 | Decorative layer |
| 10 | Upper heat press plate |
| 11 | Transparent thermoplastic foil |
| 12 | Adhesive layer |
| 13 | Colour pattern |
| 14 | Transparent or opaque thermoplastic foil |
| 15 | Base layer |
| 16 | Lower heat press plate |

The invention claimed is:

1. A method for manufacturing decorative surfaces including the steps of:
    inkjet printing an image on a first thermoplastic foil by jetting and curing one or more pigmented free radical curable inkjet inks on the first thermoplastic foil;
    applying and curing a free radical curable liquid as an adhesive layer on the inkjet printed image; and
    heat pressing the first thermoplastic foil with a second thermoplastic foil into a decorative laminate,
    wherein at least one of the first and second thermoplastic foils is a transparent thermoplastic foil;
    wherein the one or more pigmented free radical curable inkjet inks include a colour pigment and a polymerizable composition containing 10 to 90 wt % of one or more monofunctional polymerizable compounds;
    wherein the free radical curable liquid includes a polymerizable composition containing 15 wt % or more of polyfunctional polymerizable compounds and 15 wt % or more of a monofunctional polymerizable compound A or B;
    wherein all weight percentages wt % are based upon the total weight of the polymerizable composition in the pigmented free radical curable inkjet ink or the polymerizable composition in the free radical curable liquid;
    wherein monofunctional polymerizable compound A is a compound according to Formula (1):

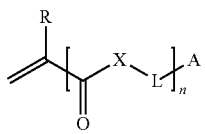

Formula (1)

wherein R is hydrogen or a methyl group; X is an oxygen or an NR'-group; L is a divalent linking group having no more than 10 carbon atoms; R' is selected from the group consisting of hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group; n is 0 or 1; and A represents a moiety according to Formula (1A):

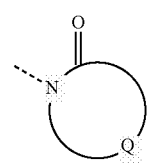

Formula (1A)

wherein Q represents the necessary atoms to form a five to eight membered ring and the dashed line represents a covalent bond to a carbon atom; and
    wherein monofunctional polymerizable compound B is a compound according to Formula (2):

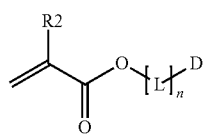

Formula (2)

with R2 is hydrogen or a methyl group; L is a divalent linking group having no more than 10 carbon atoms; n is 0 or 1; and D is a five to seven membered saturated heterocyclic ring containing a single ether group.

2. The method of claim 1, wherein the first and second thermoplastic foils include polyvinylchloride.

3. The method of claim 1, wherein the polymerizable compound A or B is selected from the group consisting of:

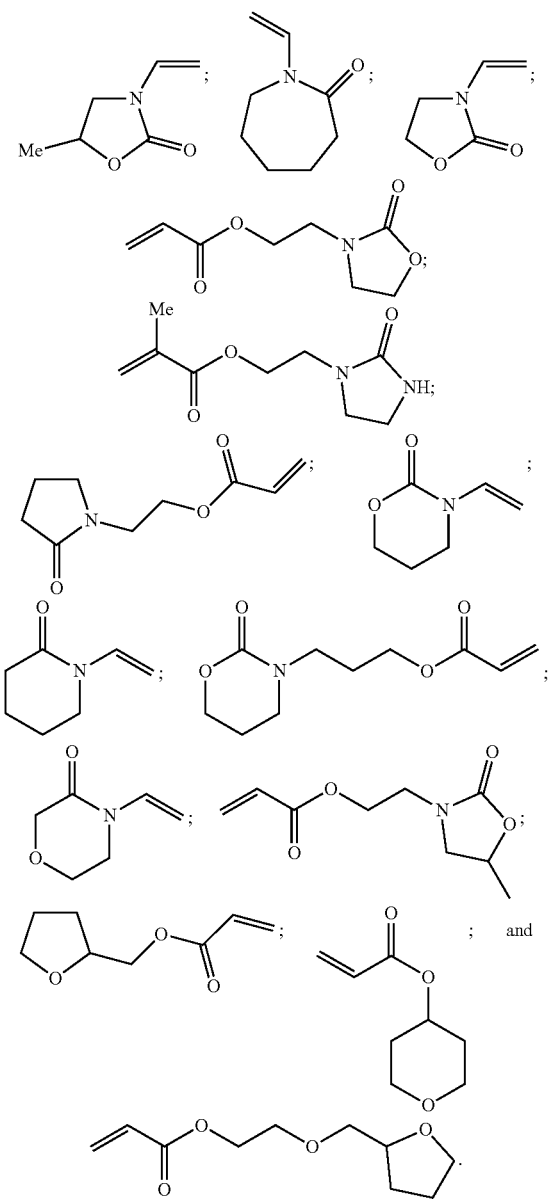

4. The method of claim 1, wherein the free radical curable liquid contains no polymerizable compound B.

5. The method of claim 1, wherein the free radical curable liquid contains a surfactant in amount of no more than 0.3 wt % based on the total weight of the free radical curable liquid.

6. The method of claim 1, wherein the free radical curable liquid has a viscosity between 5 and 15 mPa·s at 45° C. and at a shear rate of $1,000\ s^{-1}$.

7. The method of claim 1, wherein the free radical curable liquid contains a polyfunctional polymerizable compound selected from dipropylene glycol diacrylate, tricyclodecanedimethanol diacrylate, and 1,6-hexanediol diacrylate.

8. The method of claim 1, wherein the free radical curable liquid contains a polymerizable composition containing 20 wt % or more of polyfunctional polymerizable compounds and 30 wt % or more of a monofunctional polymerizable compound A or B based on the total weight of the polymerizable composition.

9. The method of claim 1, wherein the one or more pigmented free radical curable inkjet inks contain 40 to 80 wt % of one or more monofunctional polymerizable compounds based on the total weight of the polymerizable composition.

10. The method of claim 1, wherein the one or more pigmented free radical curable inkjet inks and/or the free radical curable liquid is cured by electron beam or by UV LED curing.

11. The method of claim 1, wherein the adhesive layer is applied by either a coating technique or otherwise a printing technique selected from flexographic printing and gravure printing.

12. The method of claim 1, wherein the adhesive layer is applied by jetting.

13. The method of claim 1, wherein the one or more pigmented free radical curable inkjet inks form an ink set comprising:
   a) a cyan free radical curable inkjet ink containing a copper phthalocyanine pigment or C.I. Pigment Blue 60;
   b) a red free radical curable inkjet ink containing a pigment selected from the group consisting of C.I. Pigment Red 122, C.I. Pigment Red 144, C.I. Pigment Red 176, C.I. Pigment Red 188, C.I. Pigment Red 207, C.I. Pigment Red 242, C.I. Pigment Red 254, C.I. Pigment Red 272, and mixed crystals thereof;
   c) a yellow free radical curable inkjet ink containing a pigment selected from the group consisting of C.I. Pigment Yellow 83, C.I. Pigment Yellow 93, C.I. Pigment Yellow 97, C.I. Pigment Yellow 93, C.I. Pigment Yellow 110, C.I. Pigment Yellow 120, C.I. Pigment Yellow 150, C.I. Pigment Yellow 151, C.I. Pigment Yellow 154, C.I. Pigment Yellow 155, C.I. Pigment Yellow 175, C.I. Pigment Yellow 180, C.I. Pigment Yellow 181, C.I. Pigment Yellow 194, C.I. Pigment Yellow 213, C.I. Pigment Yellow 214, and mixed crystals thereof; and
   d) a black free radical curable inkjet ink containing a carbon black pigment.

14. A decorative laminate panel including an inkjet printed decorative image printed with one or more pigmented free radical curable inkjet inks and an adhesive layer of a free radical curable liquid between a first and a second thermoplastic foil,
   wherein at least one of the first and second thermoplastic foils is a transparent thermoplastic foil;
   wherein the one or more pigmented free radical curable inkjet inks includes a colour pigment and a polymerizable composition containing 10 to 90 wt % of one or more monofunctional polymerizable compounds;
   wherein the free radical curable liquid includes a polymerizable composition containing 15 wt % or more of polyfunctional polymerizable compounds and 15 wt % or more of a monofunctional polymerizable compound A or B;
   wherein all weight percentages wt % are based upon the total weight of the polymerizable composition in the pigmented free radical curable inkjet ink or the free radical curable liquid;
   wherein monofunctional polymerizable compound A is a compound according to Formula (1):

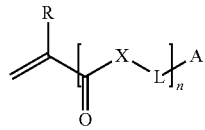

Formula (1)

wherein R is hydrogen or a methyl group; X is an oxygen or an NR'-group; L is a divalent linking group having no more than 10 carbon atoms; R' is selected from the group consisting of hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group; n is 0 or 1; and A represents a moiety according to Formula (1A):

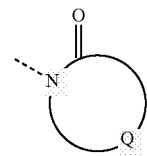

Formula (1A)

wherein Q represents the necessary atoms to form a five to eight membered ring and the dashed line represents a covalent bond to a carbon atom; and
   wherein monofunctional polymerizable compound B is a compound according to Formula (2):

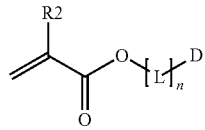

Formula (2)

with R2 is hydrogen or a methyl group; L is a divalent linking group having no more than 10 carbon atoms; n is 0 or 1; and D is a five to seven membered saturated heterocyclic ring containing a single ether group.

15. The decorative laminate of claim 14, wherein the first and second thermoplastic foils include polyvinylchloride.

* * * * *